(12) United States Patent
Shimada et al.

(10) Patent No.: US 11,732,101 B2
(45) Date of Patent: Aug. 22, 2023

(54) POLYPROPYLENE-BASED RESIN EXPANDED BEADS AND POLYPROPYLENE-BASED RESIN EXPANDED BEADS MOLDED ARTICLE

(71) Applicant: JSP CORPORATION, Tokyo (JP)

(72) Inventors: Tomohito Shimada, Utsunomiya (JP); Hajime Ohta, Utsunomiya (JP)

(73) Assignee: JSP CORPORATION, Tokyo (JP)

( * ) Notice: Subject to any disclaimer, the term of this patent is extended or adjusted under 35 U.S.C. 154(b) by 0 days.

(21) Appl. No.: 17/790,997

(22) PCT Filed: Jan. 21, 2021

(86) PCT No.: PCT/JP2021/001991
§ 371 (c)(1),
(2) Date: Jul. 6, 2022

(87) PCT Pub. No.: WO2021/157369
PCT Pub. Date: Aug. 12, 2021

(65) Prior Publication Data
US 2023/0074915 A1    Mar. 9, 2023

(30) Foreign Application Priority Data

Feb. 4, 2020 (JP) .................................. 2020-017127

(51) Int. Cl.
*B32B 27/16* (2006.01)
*C08J 9/224* (2006.01)
(Continued)

(52) U.S. Cl.
CPC ...................................... *C08J 9/16* (2013.01);
*B32B 1/00* (2013.01); *B32B 5/18* (2013.01);
*B32B 27/065* (2013.01);
(Continued)

(58) Field of Classification Search
None
See application file for complete search history.

(56) References Cited

U.S. PATENT DOCUMENTS

| | | | |
|---|---|---|---|
| 3,953,558 | A | 4/1976 | Hatano et al. |
| 4,777,000 | A | 10/1988 | Kuwabara et al. |

(Continued)

FOREIGN PATENT DOCUMENTS

| | | |
|---|---|---|
| JP | S4323858 B | 10/1968 |
| JP | S44-29522 B | 12/1969 |

(Continued)

OTHER PUBLICATIONS

International Search Report in corresponding PCT Application No. PCT/JP2021/001991, dated Mar. 30, 2021.

*Primary Examiner* — Ellen S Hock
(74) *Attorney, Agent, or Firm* — Bacon & Thomas, PLLC

(57) ABSTRACT

An expanded bead having a through hole and including a foamed core layer which defines the through hole therein and which is constituted of a resin composition containing two kinds of polypropylene-based resins having different melting points, and a cover layer covering the foamed core layer and constituted of a polyolefin-based resin. The expanded bead gives a DSC curve in which an endothermic peak intrinsic to the resin composition and another endothermic peak on a higher temperature side thereof appear in a specific heat of fusion ratio. Molded articles include a multiplicity of the expanded beads.

7 Claims, 4 Drawing Sheets

(51) Int. Cl.
*C08J 9/16* (2006.01)
*B32B 1/00* (2006.01)
*B32B 5/18* (2006.01)
*B32B 27/06* (2006.01)
*B32B 27/32* (2006.01)
*C08J 9/228* (2006.01)

(52) U.S. Cl.
CPC ............... *B32B 27/32* (2013.01); *C08J 9/224* (2013.01); *C08J 9/228* (2013.01); *B32B 2266/025* (2013.01); *B32B 2307/72* (2013.01); *C08J 2323/12* (2013.01); *C08J 2423/12* (2013.01)

(56) References Cited

U.S. PATENT DOCUMENTS

| | | |
|---|---|---|
| 5,622,756 A | 4/1997 | Tokoro et al. |
| 10,487,188 B2 | 11/2019 | Kitahara et al. |
| 2012/0100376 A1* | 4/2012 | Sakaguchi ............. C08J 9/0061 428/407 |
| 2013/0266792 A1 | 10/2013 | Nohara et al. |
| 2018/0022886 A1 | 1/2018 | Oikawa et al. |
| 2018/0215891 A1 | 8/2018 | Kitahara et al. |

FOREIGN PATENT DOCUMENTS

| | | |
|---|---|---|
| JP | S4638359 B | 11/1971 |
| JP | S5122951 B | 7/1976 |
| JP | 60185816 A | 9/1985 |
| JP | 62151325 B | 7/1987 |
| JP | 62151326 B | 7/1987 |
| JP | 649795 B | 6/1994 |
| JP | 8108441 A | 4/1996 |
| JP | S4116125 B | 12/1996 |
| JP | 2012126816 A | 7/2012 |
| JP | 2015137061 A1 | 7/2015 |
| JP | 2019030597 A | 2/2019 |
| WO | 2012081490 A1 | 6/2012 |
| WO | 2016111017 A1 | 7/2016 |
| WO | 2017010494 A1 | 1/2017 |

* cited by examiner

POLYPROPYLENE-BASED RESIN EXPANDED BEADS AND POLYPROPYLENE-BASED RESIN EXPANDED BEADS MOLDED ARTICLE

FIELD OF THE INVENTION

The present invention relates to polypropylene-based resin expanded beads having through holes and to a polypropylene-based resin expanded beads molded article that has interconnected voids and that is obtained by molding the expanded beads in a mold.

BACKGROUND OF THE INVENTION

Because a polypropylene-based resin expanded beads molded article having interconnected voids (hereinafter occasionally simply referred to as "expanded beads molded article having voids" or "expanded beads molded article") has excellent water permeability, air permeability and sound absorbing property and also excels in cushioning property, it is used for drainage materials, wall materials in buildings, automobile interior materials, etc. Further, in recent years, an expanded beads molded article having voids has been used as a seat member of an automobile because of its excellent adhesion properties to a polyurethane foam. Such a foamed molded article used as a seat member of an automobile may be, for example, one disclosed in Japanese Kokai Publication JP2019-30597.

In recent years, expanded bead molded articles having voids have been required to have higher rigidity while maintaining voidage thereof. As a method for obtaining a expanded bead molded article having excellent rigidity a thought may occur to use a polypropylene-based resin having a high melting point. However, in-mold molding of polypropylene-based resin expanded beads having a high melting point requires the use of a high vapor pressure. Thus, there is caused a problem that it is difficult to perform in-mold molding with low pressure vapor pressure.

To cope with such a problem, U.S. Pat. No. 10,487,188 discloses propylene-based resin expanded beads having a core layer that is cylindrical in shape and that is in a foamed state and a cover layer that covers the foamed core layer. The core layer is constituted of a resin in which a propylene-based resin having a low melting point and a propylene-based resin having a high melting point are mixed in a specific ratio, while the cover layer is constituted of an olefin-based resin having a melting point lower than that of the core layer. By such constitution, the expanded beads are described to be capable of in-mold molding, at a low pressure, an expanded beads molded article with voids that excels in rigidity.

PRIOR ART DOCUMENT

Patent Document

[Patent Document 1] Japanese Kokai Publication JP2019-30597
[Patent Document 2] U.S. Pat. No. 10,487,188

The expanded beads disclosed in U.S. Pat. No. 10,487,188, however, involve a limitation in range of vapor pressure that permits in-mold molding of an expanded beads molded article having a high voidage. More specifically, with the expanded beads described in U.S. Pat. No. 10,487,188, the voidage of the obtained expanded beads molded article may decrease when the vapor pressure used in the in-mold molding is high.

SUMMARY OF THE INVENTION

With the above problems in view, it is an objective problem of the present invention to provide polypropylene-based resin expanded beads with through holes that are capable of molding an expanded beads molded article having voids and being excellent in rigidity, that permit in-mold molding using a low vapor pressure, that are capable of in-mold molding an expanded beads molded article having high voidage even with such a high vapor pressure that would hitherto cause a reduction of voidage and that allow in-mold molding with a wider range of pressure. The present invention also has as its object the provision of a polypropylene-based resin expanded beads molded article that is obtained by in-mold molding of the expanded beads and that has excellent rigidity and high voidage.

Means for Solving the Problems

In accordance with the present invention, there is provided an expanded bead with a through hole and an expanded beads molded article with interconnected voids as follows:

[1] An expanded bead having a through hole, said expanded bead comprising a foamed core layer that defines the through hole therein and that includes a polypropylene-based resin composition, and a cover layer that covers the foamed core layer and that includes a polyolefin-based resin, wherein said polypropylene-based resin composition comprises 70 to 97% by weight of a polypropylene-based resin PP1 having a melting point of higher than 140° C. and not higher than 150° C., and 3 to 30% by weight of a polypropylene-based resin PP2 having a melting point of not lower than 145° C. and not higher than 160° C., provided that a total amount of the resin PP1 and the resin PP2 is 100% by weight, wherein a difference between the melting point of the polypropylene-based resin PP2 and the melting point of the polypropylene-based resin PP1 [(melting point of PP2)−(melting point of PP1)] is not smaller than 5° C. and smaller than 15° C., said expanded bead having such a crystal structure that gives a first time DSC curve when measured by heat flux differential scanning calorimetry in which said expanded bead is heated from 30° C. to 200° C. at a heating rate of 10° C./min, wherein said first time DSC curve has a main endothermic peak intrinsic to the polypropylene-based resin composition and a high temperature-side endothermic peak which is located on a higher temperature side of the main endothermic peak, wherein said high temperature-side endothermic peak has a heat of fusion of 12 to 20 J/g, and wherein a ratio of a heat of fusion of said main endothermic peak to the heat of fusion of said high temperature-side endothermic peak is 3.5 or greater.

[2] The polypropylene-based resin expanded bead according to above [1], wherein the melting point of the polypropylene-based resin PP1 is higher than 140° C. and not higher than 145° C. and the melting point of the polypropylene-based resin PP2 is not lower than 150° C. and not higher than 155° C.

[3] The polypropylene-based resin expanded bead according to above [1] or [2], wherein the polypropylene-based resin PP2 has a melt flow rate (MFR) of 2 to 18 g/10 min at 230° C. and a load of 2.16 kg.

[4] The polypropylene-based resin expanded bead according to any one of above [1] to [3], wherein the polypropylene-based resin PP1 and the polypropylene-based resin PP2 are each a polypropylene-based resin that is obtained by polymerization using a Ziegler-Natta catalyst.

[5] The polypropylene-based resin expanded bead according to any one of above [1] to [4], wherein the expanded bead have a bulk density of 15 to 50 kg/cm$^3$.

[6] The polypropylene-based resin expanded bead according to any one of above [1] to [5], having an average outer diameter D [mm], an average hole diameter d [mm] of the through hole and an average wall thickness t [mm] which is defined as (D−d)/2, wherein t is 0.8 to 2 mm and t/d is 0.4 to 1.

[7] A polypropylene-based resin expanded beads molded article comprising a multiplicity of the expanded beads according to any one of above [1] to [6] that are fusion-bonded to each other, said expanded beads molded article being formed with interconnected voids and having a voidage of 20% or more.

Effect of the Invention

According to the present invention, polypropylene-based resin expanded beads that are capable of in-mold molding, in a wider pressure range than before, an expanded beads molded article having excellent rigidity and a high voidage are provided.

BRIEF DESCRIPTION OF THE DRAWINGS

FIG. 2(a) is a schematic cross-sectional view showing an example of a foamed core layer.

DETAILED DESCRIPTION OF THE INVENTION

The polypropylene-based resin expanded beads having through holes and the polypropylene-based resin expanded beads molded article having interconnected voids (hereinafter, occasionally simply referred to as "expanded beads molded article" or "molded article") according to the present invention will be described in detail below. In the present specification, "A to B" representing a numerical range is synonymous with "A or more and B or less", and represents a numerical range including A and B which are end points of the numerical range. Further, in the specification and claims, the singular form (a, an, the) includes the plural form unless the context clearly indicates otherwise. Thus, for example, "an expanded bead" is intended to include "two or more expanded beads". Unless there is clear indication in the specification or unless there is clear contradiction from the context, the singular form includes the plural form.

The polypropylene-based resin expanded beads having through holes of the present invention (hereinafter, occasionally simply referred to as "expanded beads") are multilayered expanded beads each having a foamed core layer and a cover layer covering the foamed core layer. An intermediate layer may be provided between the foamed core layer and the cover layer, but it is preferable not to provide such an intermediate layer because it is desired to reduce the thickness of the cover layer for the reasons described later. The expanded beads are preferably non-crosslinked for reasons of their excellent recyclability, production efficiency and the like.

Figure 1:
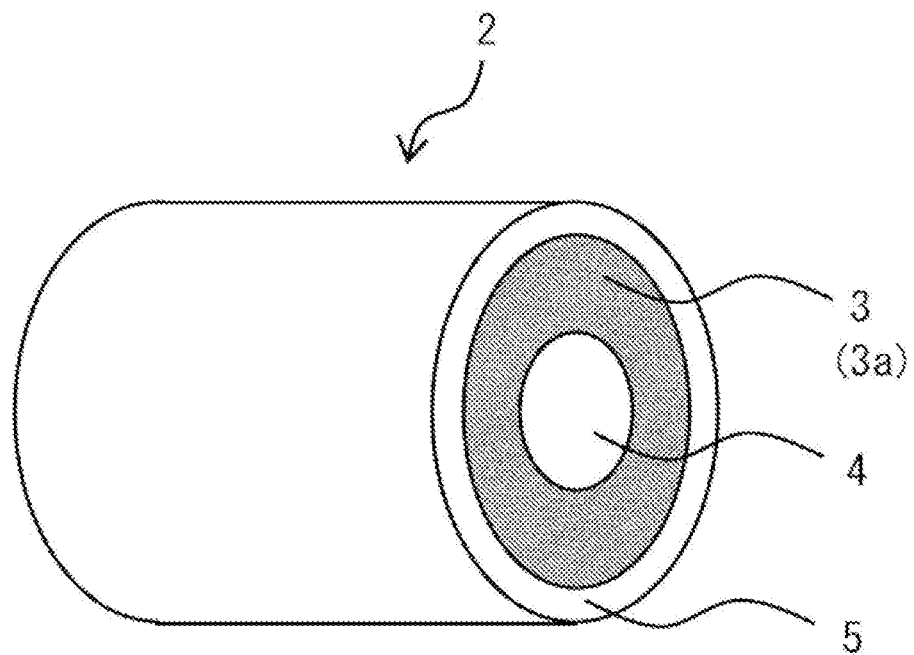
FIG. 1 is a perspective view illustrating one embodiment of an expanded bead of the present invention.

FIG. 1 is a schematic illustration showing an example of polypropylene-based resin expanded bead having a tubular foamed core layer and a cover layer covering the foamed core layer. The expanded bead represented by reference numeral 2 is generally a cylindrical foam body having a through hole 4. The expanded bead 2 include a foamed core layer 3 that defines the through hole 4 therein, and a cover layer 5 that covers the foamed core layer 3.

The cover layer 5 may or may not be foamed. In order to achieve the purpose of increasing the rigidity of the expanded beads molded article, however, it is preferred that the cover layer 5 is not foamed. As used herein, "being not foamed" means not only a case where cells are not at all present in the cover layer (including the case where the cells once formed are melted and broken so that the cells disappear), but also a case where very fine cells are present in a small amount, namely where substantially no foaming occurs. Further, "covering the foamed core layer 3" does not mean that the entire foamed core layer 3 should be covered; i.e. it is permissive that a part of the foamed core layer 3 is exposed. It is preferred that the entire peripheral surface on the side surface of the cylindrical foamed core layer 3 is covered, since the fusion property of the expanded beads can be more reliably improved. Entire or most of each end surface of the foamed core layer 3, in which the through hole 4 opens, is not covered with the cover layer 5.

The resin constituting the foamed core layer 3 will be described next.

The foamed core layer comprises a polypropylene-based resin composition (a) (hereinafter occasionally simply referred to as "resin composition (a)").

In the present specification, the polypropylene-based resin refers to a resin having a constituent unit derived from propylene as a main constituent unit. As used herein, the term "main constituent unit" means that the content percentage of the propylene component units in the polymer is greater than 50% by weight, preferably 80% by weight or more, more preferably 90% by weight or more.

The polypropylene-based resin may be a propylene homopolymer or a propylene-based copolymer containing a structural unit derived from propylene and other structural unit. As the propylene-based copolymer, there may be mentioned a copolymer of propylene and ethylene or/and an α-olefin having 4 to 20 carbon atoms. Specific examples thereof include copolymers of propylene with one or more comonomer selected from ethylene, 1-butene, 1-pentene, 1-hexene, 1-octene, 4-methyl-1-butene, 4-methyl-1-pentene, etc. Further, the propylene-based copolymer may be a binary copolymer such as a propylene-ethylene random copolymer, a propylene-1-butene random copolymer or the like, or a ternary copolymer such as a propylene-ethylene-butene random copolymer or the like. The expanded beads containing these random copolymers as a main component are excellent in secondary expansion property at the time of in-mold molding and also excellent in mechanical properties.

The total content in the propylene-based copolymer of ethylene or/and a comonomer component such as an α-olefin having 4 to 20 carbon atoms is preferably 25% by weight or less, and more preferably 10% by weight or less.

The polypropylene-based resin composition (a) constituting the foamed core layer of the present invention contains, as its main components, a polypropylene-based resin PP1 (hereinafter occasionally simply referred to as "resin PP1" or "PP1") and a polypropylene-based resin PP2 (hereinafter occasionally simply referred to as "resin PP2" or "PP2") that satisfy the following requirements (i) and (ii):

(i) the polypropylene-based resin composition (a) comprises 70% by weight to 97% by weight of the propylene-based resin PP1 having a melting point MP1 that is higher than 140° C. and not higher than 150° C., and 3% by weight to 30% by weight of the polypropylene-based resin PP2 having a melting point MP2 which is not lower than 145° C. and not higher than 160° C. [provided that the total of the resin PP1 and the resin PP2 is 100% by weight], (ii) the difference (MP2−MP1) between the melting point MP2 of the resin PP2 and the melting point MP1 of the resin PP1 is not smaller than 5° C. and smaller than 15° C., in other words, MP1 and MP2 satisfy the following relationship:

$$5° C. \leq MP2-MP1 < 15° C.$$

The meaning of the requirements (i) and (ii) and effects thereof will be described in detail hereinafter.

As used herein, the term "contains the resin PP1 and the resin PP2 as its main components" is intended to mean that the total amount of PP1 and PP2 in the resin composition (a) exceeds 50% by weight. The total amount of the resins PP1 and PP2 in the resin composition (a) is preferably 80% by weight or more, more preferably 90% by weight or more.

Among the above described polypropylene-based resins, the following polypropylene-based resins are preferable as the resins PP1 and PP2.

The resin PP1 is preferably a propylene-based random copolymer, more preferably a propylene-ethylene random copolymer. The total content of the comonomer components in the resin PP1 is preferably 0.5% by weight or more, more preferably 1.0% by weight or more, more preferably 1.0% by weight or more, still more preferably 1.5% by weight or more, in consideration of the melting point and foamability of the resin PP1. For the same reasons, the total content of the comonomer components in the resin PP1 is preferably 10% by weight or less, more preferably 8.0% by weight or less, still more preferably 5.0% by weight or less.

The resin PP2 is preferably a propylene-based random copolymer for reasons of excellent compatibility thereof with the resin PP1 and of expected improvement of the mechanical properties and secondary foamability of the obtained expanded beads. Among them, a random copolymer of propylene and ethylene or/and 1-butene is more preferred. The total content of the comonomer components in the resin PP2 is preferably 0.3% by weight or more, more preferably 0.5% by weight or more, still more preferably 0.8% by weight or more in consideration of the melting point, mechanical properties, etc. of the resin PP2. For the same reasons, the total content of the comonomer components in the resin PP2 is preferably 5.0% by weight or less, more preferably 3.0% by weight or less, still more preferably 1.0 or less.

It is further preferred that the total content of comonomer components in the resin PP2 is lower than the total content of the comonomer components in the resin PP1 in order to more reliably achieve the objective effect of the present invention of being capable of molding a molded article having excellent rigidity and a high voidage in a wide pressure range.

It is preferred that the resin PP1 and the resin PP2 used in the present invention are polypropylene-based resins obtained by polymerization in the presence of a Ziegler-Natta polymerization catalyst. Polypropylene resins produced using a Ziegler-Natta polymerization catalyst tend to have a wider molecular weight distribution than polypropylene resins produced using a metallocene catalyst. Therefore, the expanded beads made of a polypropylene resin polymerized using the Ziegler-Natta catalyst are superior in secondary expansion properties compared with the expanded beads made of a polypropylene resin polymerized using a metallocene polymerization catalyst, and show superior secondary expansion properties under a wide range of vapor pressures ranging from a low pressure to a high pressure.

The Ziegler-Natta-based polymerization catalyst is an organometallic complex containing titanium, aluminum, magnesium, etc. as a nuclear element and being partially or wholly modified with an alkyl group.

The polypropylene-based resin composition (a) may contain other resins, polymers such as rubbers and elastomers, additives and the like, to the extent that the effects of the present invention are achieved.

As the other resin components, there may be mentioned, for example, ethylene-based resins such as high density polyethylene, low density polyethylene, linear low density polyethylene, linear ultra low density polyethylene, an ethylene-vinyl acetate copolymer, an ethylene-acrylic acid copolymer and an ethylene-methacrylic acid copolymer, styrene-based resins such as polystyrene and a styrene-maleic anhydride copolymer, and polyamide resins. The rubbers and elastomers may be rubbers such as ethylene-propylene rubber, ethylene-1-butene rubber, propylene-1-butene rubber, ethylene-propylene-diene rubber, isoprene rubber, neoprene rubber, nitrile rubber, etc. and thermoplastic elastomers such as a styrene-butadiene-styrene block copolymer, a styrene-isoprene-styrene block copolymer, a hydrogenated product of a styrene-butadiene-styrene block copolymer, a hydrogenated product of a styrene-isoprene-styrene block copolymer, etc.

These polymers may be used in combination of two or more. When the resin composition (a) contains such other polymer components, the total amount thereof is preferably 20 parts by weight or less, preferably 15 parts by weight or less, more preferably 10 parts by weight or less, and particularly preferably 5 parts by weight or less, based on 100 parts by weight of the entire resin composition (a).

Examples of the additive include various kinds of additives such as a cell controlling agent, e.g. zinc borate, an antistatic agent, a flame retardant, a conductivity imparting agent, a lubricant, an antioxidant, an ultraviolet absorber, a metal deactivator, a pigment, a dye, a crystal nucleating agent and an inorganic filler. These may be incorporated into the resin composition (a) as desired. Strictly speaking, the amount of the additive varies depending on the purpose of addition, but it is preferably 0.5 to 25 parts by weight, more preferably 1 to 15 parts, still more preferably 3 to 15 parts by weight, based on 100 parts by weight of the total of the resin PP1 and the resin PP2.

It is preferred that the melt flow rate (MFR) of the resin PP1 is 1 g/10 min or more, more preferably 3 g/10 min or more, still more preferably 6 g/10 min or more, and is preferably 30 g/10 min or less, more preferably 20 g/10 min or less, still more preferably 15 g/10 min or less, because of an excellent balance between foamability, moldability, mechanical properties and the like.

It is preferred that the melt flow rate (MFR) of the resin PP2 is 2 g/10 min or more, more preferably 3 g/10 min or more, still more preferably 5 g/10 min or more, and is preferably 18 g/10 min or less, more preferably 15 g/10 min or less, still more preferably 12 g/10 min or less, because of excellent effect of improving foamability under a wide range of pressures and excellent effect of improving mechanical physical properties.

As used herein, the MFR of the polypropylene-based resins PP1 and PP2 and the polypropylene-based resin composition (a) is a value as measured under the test condition M (temperature of 230° C., load of 2.16 kg) of JIS K7210(2014), while the MFR of the polyethylene-based resin is a value as measured under test condition D (temperature of 190° C., load of 2.16 kg) of JIS K7210(2014).

The expanded beads having through holes according to the present invention have a specific crystal structure that satisfies the following requirements (1) and (2).

Namely, the expanded beads have such a crystal structure that gives a first time DSC curve when measured by heat flux differential scanning calorimetry in which the expanded beads are heated from 30° C. to 200° C. at a heating rate of 10° C./min. The first time DSC curve has a main endothermic peak that is intrinsic to the polypropylene-based resin composition (a) and a high temperature-side endothermic peak that is located on a higher temperature side of the main endothermic peak, wherein:
(1) a heat of fusion $\Delta Hh$ of the high temperature side endothermic peak (high temperature peak calorific value) is 12 to 20 J/g, and
(2) a ratio $\Delta Hm/\Delta Hh$ of a heat of fusion $\Delta Hm$ of the intrinsic main endothermic peak (intrinsic peak calorific value) to the heat of fusion $\Delta Hh$ of the high temperature side endothermic peak is 3.5 or greater.

The expanded beads of the present invention, which comprise the resin composition (a) containing the polypropylene-based resin PP1 and the polypropylene-based resin PP2 as main components and also have a crystal structure that satisfies the requirements (1) and (2), show excellent fusion property and secondary expansion property and permit in-mold molding of a good expanded beads molded article even with a low vapor pressure. Further, even when in-mold molding is carried out at such a high vapor pressure that would cause a reduction of voidage with the conventional technique, it is possible to suppress the reduction of the voidage. Moreover, the obtained expanded beads molded article has excellent rigidity.

The meanings of requirements (1) and (2) and effects thereof will be described in detail hereinafter.

Next, the meanings of the requirements (i) and (ii) of the expanded beads and effects thereof will be described in detail.

The polypropylene-based resin composition (a) constituting the foamed core layer of the present invention is (i) a mixed resin containing a low melting point resin PP1 having a melting point MP1 of more than 140° C. and 150° C. or lower as a main component, and a high melting point resin having a melting point MP2 of 145° C. or higher and 160° C. or lower as an auxiliary component. Further, (ii) the difference (MP2)−(MP1) between the melting point MP2 of the resin PP2 and the melting point MP1 of the resin PP1 is 5° C. or higher and lower than 15° C.

Since the resin composition (a) constituting the expanded beads of the present invention contains the resin PP2 having a high melting point as an auxiliary component, the obtained expanded bead molded article has high rigidity as required for, for example, an automobile seat member.

Further, since the resin composition (a) contains the resin PP1 having a low melting point as a main component, the expanded beads of the present invention permit in-mold molding at a low vapor pressure. Additionally, whilst the expanded beads contain, as an auxiliary component, the resin PP2 having a melting point higher than that of the resin PP1, it is possible to obtain such an effect that the in-mold molding is able to be carried out at a vapor pressure which is nearly the same as the vapor pressure required for in-mold molding with the resin PP1 by itself or lower than such a required vapor pressure.

The reason for this is considered to be as follows. In the expanded beads of the present invention, the foamed core layer is comprised of a mixed resin in which the low melting point resin PP1 is mixed with the resin PP2 having a melting point higher than that of the resin PP1 at a specific ratio, so that the ratio $\Delta Hm/\Delta Hh$ of the intrinsic peak calorific value $\Delta Hm$ to the high temperature peak calorific value $\Delta Hh$ in the first time DSC curve tends to be large. That is, low-potential crystals showing a peak on a low temperature side are present in a significant amount in the expanded beads of the present invention and are able to contribute to expansion thereof during in-mold molding at a low vapor pressure. As a result, the expanded beads are considered to exhibit improved secondary expansion properties.

Since, in the expanded beads of the present invention, the low melting point resin PP1 having a melting point within the above range is mixed with the high melting point resin PP2, it becomes easy, for example, to set the expansion temperature high. It is thus inferred that for this reason expanded beads having a crystal structure showing a large proportion of the main endothermic peak calorific value ratio can be easily obtained. The crystal structure and setting of the expansion temperature to be high will be described hereinafter.

Further, with the expanded beads of the present invention, even when in-mold molding is carried out at a high vapor pressure, a reduction of the voidage of the obtained expanded beads molded article is inhibited. As a result, there is obtained an effect that the range of the vapor pressure in which a molded article having a high voidage is obtainable is widened toward the high vapor pressure side. The reason why a reduction of the voidage of the expanded beads molded article is suppressed even when the expanded beads are in-mold molded at a high pressure is considered as follows.

The voidage of a multilayer expanded beads molded article is generally known to decrease as the molding pressure increases. The reason for this is as follows. In in-mold molding at a low vapor pressure, the cover layer melts and is fusion bonded before the secondary expansion of the core layer is completed (while keeping the hole diameters of the through holes sufficiently), so that a molded article having a high voidage is easily obtainable. In the in-mold molding with a high vapor pressure, on the other hand, the secondary expansion of the core layer proceeds and the fusion bonding proceeds in a state where the through holes are crushed. For this reason the voidage tends to decrease.

In the expanded beads of the present invention, since the foamed core layer is comprised of a mixed resin in which the resin PP1 and resin PP2 having specific melting point ranges are mixed at a specific ratio, since the resin PP2 having a high melting point is used as an auxiliary component, and since a polypropylene-based resin having a high melting point of higher than 140° C. but not higher than 150° C. is also used as the resin PP1 being a main component with a lower melting point, the melting point of the entire core layer is able to be adjusted to a higher level. It is considered that as a consequence of the above, a molded article having a high voidage can be in-mold molded in a wide vapor pressure range encompassing from a low vapor pressure to a high vapor pressure.

The melting point MP1 of the polypropylene resin PP1 is higher than 140° C. and not higher than 150° C. or less. When the melting point MP1 exceeds 150° C., there is a possibility that the vapor pressure required for in-mold molding of the expanded beads increases. For this reason, the melting point MP1 is preferably 148° C. or lower, more preferably 146° C. or lower, still more preferably 145° C. or lower, particularly preferably 144° C. or lower. When the melting point MP1 is 140° C. or lower, there is a possibility that the voidage of the molded article decreases in case where the vapor pressure during the in-mold molding is increased. For this reason, the melting point MP1 is preferably 141° C. or higher, more preferably 142° C. or higher.

The melting point MP2 of the polypropylene resin PP2 is 145° C. or higher and 160° C. or lower. When the melting point MP2 exceeds 160° C., adjustment of the high temperature peak calorific value of the expanded beads within the range of the requirement (1) is difficult so that there is a possibility that the moldability of the expanded beads and the rigidity of the obtained molded article are reduced. For this reason, the melting point MP2 is preferably 158° C. or lower, more preferably 156° C. or lower, still more preferably 155° C. or lower, particularly preferably 153° C. or lower. When the melting point MP2 is less than 145° C., there is a possibility that the rigidity of the obtained molded article decreases. Further, it becomes difficult to control the ratio $\Delta Hm/\Delta Hh$ of the intrinsic peak calorific value $\Delta Hm$ to the high temperature peak calorific value $\Delta Hh$ of the expanded beads, so that there is a possibility that the effect of reducing the molding pressure cannot be sufficiently obtained. For the above reasons, the melting point MP2 is preferably 146° C. or higher, more preferably 148° C. or higher, still more preferably 150° C. or higher, particularly preferably 151° C. or higher.

The difference (MP2−MP1) between the melting point MP2 of the resin PP2 and the melting point MP1 of the resin PP1 is 5° C. or higher and lower than 15° C. When the melting point difference is excessively small, there is a possibility that the range of vapor pressure that permits the formation of a molded article having a high voidage is narrowed. For this reason, the melting point difference (MP2−MP1) is preferably 6° C. or higher, more preferably 8° C. or higher. When the melting point difference is excessively large, the foamability is difficult to be controlled, so that there is a possibility that the objective and effect of the present application cannot be achieved. For this reason, the melting point difference (MP2−MP1) is preferably 13° C. or lower, more preferably 12° C. or lower.

Melting points MP1 and MP2 may be measured in accordance with JIS K7121(2012). More specifically, a resin piece used as a sample is heated from 30° C. to 200° C. at a heating rate of 10° C./min. Thereafter, the temperature is lowered to 30° C. at a cooling rate of 10° C./min and then again raised from 30° C. to 200° C. at a heating rate of 10° C./min to obtain a DSC curve. The temperature at the apex of the melting peak in the obtained DSC curve represents the melting point. When two or more melting peaks appear, the temperature of the apex of the melting peak having the largest area represents the melting point.

The content of the resin PP1 in the resin composition (a) is 70% by weight to 97% by weight, while the content of the resin PP2 is 3% by weight to 30% by weight. Here, the total amount of the resin PP1 and the resin PP2 is 100% by weight. When the contents of the resin PP1 and the resin PP2 are within the above ranges, an expanded beads molded article having a high voidage and excellent rigidity can be obtained by in-mold molding in a wide vapor pressure range.

When the content of the resin PP2 is excessively small, there is a possibility that the desired rigidity improving effect is not obtained. When the content of the resin PP2 is excessively large, on the other hand, the properties of the resin PP2 having a high melting point are largely reflected, so that there is a possibility that the moldability on the low vapor pressure side is reduced.

For the above reasons, the lower limit of the content of the resin PP1 is preferably 75% by weight, more preferably 80% by weight, still more preferably 85% by weight. The upper limit thereof is preferably 95% by weight, more preferably 93% by weight, still more preferably 90% by weight. On the other hand, the lower limit of the content of the resin PP2 is preferably 5% by weight, more preferably 7% by weight, still more preferably 10% by weight, while the upper limit thereof is preferably 25% by weight, more preferably 20% by weight, still more preferably 15% by weight.

The DSC curve of the expanded beads of the present invention will be next described. The first time DSC curve of the expanded beads obtained under the above-described specific DSC measurement conditions has a main endothermic peak that is intrinsic to the polypropylene-based resin composition (a) and a high temperature side endothermic peak that is located on a higher temperature side of the main endothermic peak and, additionally, satisfies the following requirements (1) and (2):

(1) the heat of fusion $\Delta Hh$ of the high temperature-side endothermic peak is 12 to 20 J/g; and (2) a ratio $\Delta Hm/\Delta Hh$ of a heat of fusion $\Delta Hm$ of the main endothermic peak to the heat of fusion $\Delta Hh$ of the high temperature-side endothermic peak is 3.5 or greater.

When the high temperature peak calorific value ΔHh is within the above range, the expanded beads have excellent moldability. Further, the rigidity of the obtained expanded beads molded article is improved. For the above reasons, the calorific value ΔHh is preferably 13 to 18 J/g.

When the ratio ΔHm/ΔHh is 3.5 or greater, the crystals showing a peak on the low temperature side (low potential crystals) increase, so that the secondary expansion properties at the time of in-mold molding at a low vapor pressure is particularly improved.

For this reason, the ratio ΔHm/ΔHh is preferably 3.6 or greater, more preferably 3.7 or greater. The upper limit of the ratio ΔHm/ΔHh is generally 4.2. The ratio ΔHm/ΔHh may be controlled by adjusting the expansion temperature and blowing agent impregnation pressure at the time of producing the expanded beads, or the temperature and holding time in the crystallization step, and the like. In the expanded beads of the present invention, since the low melting point resin PP1 and the high melting point resin PP2 having melting points within the range defined in (i) above are mixed, it becomes easy, for example, to set the expansion temperature high, so that the expanded beads having a crystal structure with a large ΔHm/ΔHh ratio can be easily obtained.

The high temperature peak calorific value ΔHh and the intrinsic peak calorific value ΔHm (low-temperature peak calorific value) of the expanded beads are measured by a measurement method based on JIS K7122(2012) as follows. The expanded beads in an amount of 1 to 3 mg are sampled and heated and measured with a heat flux differential scanning calorimetry device from 30° C. to 200° C. at 10° C./min. An example of a first DSC curve obtained by such measurement is shown in FIG. 6.

In the DSC curve of FIG. 6, there appear a main endothermic peak A (intrinsic peak A) on a low temperature side and a high temperature peak B on a high temperature side of the intrinsic peak A. The quantities of the heat of the intrinsic peak A and the high temperature peak B correspond to the areas of respective peak areas, which may be specifically determined as follows.

A straight line (α-β) connecting a point α on the DSC curve at 80° C. and a point β on the DSC curve at an end temperature of melting T of the expanded beads is drawn. The end temperature of melting T is an intersection at which the DSC curve on a high temperature side of the high temperature peak B meets the base line. Next, a straight line which is parallel with the ordinate and which passes a point γ on the DSC curve at the bottom of the valley between the intrinsic peak A and the high temperature peak B is drawn. The point at which this line crosses the straight line (α-β) is designated as σ.

The area of the high temperature peak B is the area bounded by the curve of the high temperature peak B of the DSC curve, the line segment (σ-β) and the line segment (γ-σ), and corresponds to the high temperature peak calorific value ΔHh. The area of the intrinsic peak is the area bounded by the curve of the resin intrinsic peak A of the DSC curve, the line segment (α-β) and the line segment (γ-σ), and corresponds to the intrinsic peak calorific value ΔHm.

The high temperature peak is observed in the first time DSC curve obtained in the heating of the sample of expanded beads from 30° C. to 200° C. at 10° C./min as described above, but does not appear in the second time DSC curve which is obtained by subsequently lowering, after the first time DSC measurement, the temperature from 200° C. to 30° C. at 10° C./min and again raising the temperature to 200° C. at 10° C./min. Therefore, whether or not a high temperature peak exists in the first time DSC curve may be easily determined by performing the second DSC measurement following the first DSC measurement to obtain the second time DSC curve. That is, the endothermic peak in the first time DSC curve that appears in the first time DSC curve but does not exist in the second time DSC curve is recognized as a high temperature peak.

The heat of fusion of the polypropylene-based resin PP1 is preferably 30 to 100 J/g, more preferably 40 to 80 J/g, still more preferably 50 to 75 J/g in order to further improve expandability, moldability, mechanical strength and the like.

The heat of fusion of the resin PP2 is preferably higher than the heat of fusion of the resin PP1. The expanded beads are considered to be able to be in-mold molded with a lower vapor pressure, when heat of fusion of the resin PP2 is higher than the heat of fusion of the resin PP1. For this reason, the heat of fusion of the resin PP2 is preferably 40 to 120 J/g, more preferably 60 to 100 J/g, still more preferably 75 to 90 J/g.

The heat of fusion of the resin PP1 and the resin PP2 may be measured based on JIS K7122: 2012 using a heat flux differential scanning calorimeter using a resin piece as a sample. When a plurality of melting peaks appear on the DSC curve, the total area of the plurality of melting peaks represents the heat of fusion.

It is preferred that the resin PP1 has a flexural modulus of 600 to 1200 MPa, more preferably 800 to 1,000 MPa, for reasons of excellent balance between expandability, moldability, mechanical properties and the like.

The flexural modulus of the resin PP2 is preferably 1,000 to 1,800 MPa, more preferably 1,200 to 1,500 MPa, for reasons of excellent effect of improving mechanical properties and the like.

The flexural modulus of the resin PP1 and the resin PP2 may be measured according to JIS K7171(2008).

The cover layer of the expanded bead will be next described.

The cover layer is a layer covering the core layer and is comprised of a polyolefin resin (b).

The polyolefin-based resin (b) refers to a resin containing, as a main constituent unit, a constituent unit derived from ethylene or an α-olefin such as propylene and 1-butene. Here, the main constituent unit means a constituent unit whose content in the polymer is more than 50% by weight, preferably more than 80% by weight.

The following (b1), (b2) and (b3) may be mentioned as examples of the polyolefin-based resin (b).

(b1) There may be mentioned a homopolymer of ethylene or an α-olefin such as an ethylene homopolymer and a propylene homopolymer.

(b2) There may be mentioned a copolymer of two or more kinds of monomer components selected from ethylene and an α-olefin. The copolymer is preferably one that contains at least one of a constituent unit derived from ethylene and a constituent unit derived from propylene. Examples of the ethylene copolymer include an ethylene-1-pentene copolymer, an ethylene-1-hexene copolymer and an ethylene-4-methyl-1-pentene copolymer. Examples of the propylene copolymer include a propylene-ethylene copolymer, a propylene-1-butene copolymer and a propylene-ethylene-1-butene copolymer. These copolymers may be block copolymers, random copolymers or graft copolymers.

(b3) There may be mentioned a copolymer of ethylene or/and an α-olefin and an other monomer component such as styrene. The copolymer is preferably one whose constituent unit derived from ethylene or/and α-olefin is a constituent unit derived from ethylene or/and a constituent unit derived from propylene. For example, there may be mentioned an ethylene-styrene copolymer, an ethylene-vinyl acetate copolymer, ethylene-methyl methacrylate copolymer and an ethylene-methacrylic acid copolymer.

As the resin constituting the cover layer in the present invention, a polyethylene-based resin is preferable for reasons of excellent fusion bondability of the expanded beads. The polyethylene-based resin means a polymer or copolymer of the above (b1) to (b3) in which the constituent unit derived from ethylene is the main structural unit thereof. Above all, the copolymer of (b2) is preferred. Specifically, linear low-density polyethylene and linear ultra-low density polyethylene are more preferable.

The polyolefin-based resin (b) may be crystalline or amorphous. Whether the resin (b) is crystalline or amorphous may be determined from a DSC curve obtained by heat flow differential scanning calorimetry in which the resin (b) is used as a sample. In the case of a crystalline resin, an endothermic peak appears on the DSC curve, while, in the case of amorphous resin, no endothermic peaks appear on the DSC curve.

When the polyolefin-based resin (b) is a crystalline polyolefin-based resin, it is preferred that the resin (b) has a melting point (TmB) lower than the melting point (TmA) of the polypropylene-based resin composition (a) and that a difference [TmA−TmB] between the melting point (TmA) and the melting point (TmB) is more than 0° C. and not higher than 80° C. When this condition is satisfied, the expanded beads have excellent fusion bonding properties. For this reason, the difference [TmA−TmB] is more preferably 5° C. or higher and 60° C. or lower, still more preferably 7° C. or higher and 50° C. or lower, particularly preferably 10° C. or higher and 40° C. or lower.

When the olefin-based resin (b) is an amorphous polyolefin resin, it is preferred that the resin (b) has a softening point (TsB) lower than the melting point (TmA) of the polypropylene resin composition (a) and that a difference [TmA−TsB] between the melting point (TmA) and the softening point (TsB) is more than 0° C. and 100° C. or lower. When this condition is satisfied, the expanded beads have excellent fusion bonding properties. For this reason, the difference [TmA−TsB] is more preferably 10° C. or higher and 80° C. or lower, still more preferably 15° C. or higher and 75° C. or lower, particularly preferably 20° C. or higher and 70° C.

The resin (b) may be polymerized using various polymerization catalysts. Examples of the polymerization catalyst include Ziegler-Natta-based polymerization catalysts and metallocene-based polymerization catalysts. Among these polymerization catalysts, metallocene-based polymerization catalysts are preferred. When a metallocene-based polymerization catalyst is used, an olefin-based resin which is more excellent in fusion property and which has a low melting point or a low softening point may be obtained.

To the extent that the effects of the present invention are achieved, the resin (b) constituting the cover layer of the expanded beads of the present invention may contain other polymer components, that are allowed to be contained in the above-mentioned resin composition (a).

The total amount of the such other polymer components in the cover layer is preferably about 20 parts by weight or less, more preferably 15 parts by weight or less, still more preferably 10 parts by weight or less, particularly preferably 5 parts by weight or less based on 100 parts by weight of the resin (b).

Further, the resin (b) may contain various additives. Examples of the additives include those similar to the additives used in the resin (a). The amount of the additive varies depending on the purpose of addition, but is preferably about 25 parts by weight or less, more preferably 20 parts by weight or less, still more preferably 15 parts by weight or less, particularly preferably 8 parts by weight or less. The resin (b) can contain such additives without inhibiting expandability.

It is preferred that a weight ratio (% by weight) of the foamed core layer to the cover layer is 99.5:0.5 to 75:25, more preferably 98:2 to 80:20, still more preferably 96:4 to 90:10. When the weight ratio between the foamed core layer and the cover layer is within the above range, the fusion bonding improving effect of the cover layer is further improved, and the rigidity of the obtained expanded beads molded article becomes more excellent.

In the expanded beads of the present invention, the thickness of the cover layer is preferably 1 μm to 50 μm, more preferably 2 μm to 20 μm, still more preferably 3 μm to 10 μm. When the thickness of the cover layer is within the above range, the fusion bondability at the time of in-mold molding is improved, and the rigidity of the obtained expanded beads molded article is further improved.

Next, the shape and dimensions of the expanded bead of the present invention will be described.

As shown in FIG. 1, the expanded bead 2 of the present invention has a foamed core layer 3 having a through hole 4 and a cover layer 5 that covers the foamed core layer 3. The whole shape thereof is generally cylindrical. The foamed core layer 3 may be embodied in various forms 3a to 3m as shown in, for example, FIGS. 2(a) to 2(h) and FIGS. 3(a) to 3(d). The foamed core layer 3 is generally a foamed core layer 3a having a circular cross section, as shown in FIG. 2(a). If necessary, there may be adopted a core layer 3b having a triangular cross section as shown in FIG. 2(b), a core layer 3c having a hexagonal cross section as shown in FIG. 2(c), a core layer 3d having a bisected circular cross section as shown in FIG. 2(d), core layers 3e and 3f having a cross section in which a plurality of circles are combined as shown in FIGS. 2(e) and 2(f), a core layer 3g having a circular cross section with a partially cut-away part as shown in FIG. 2(g) and a core layer 3h having a rectangular cross section with a partially cut-away part as shown in FIG. 2(h). There may be further adopted a core layer 3i having a cross section having a shape in which three limb-shaped portions e extend from a circular circumference as shown in FIG. 3(a), a core layer 3j having a cross section in which three limb-shaped portions e extend from each side of a triangle as shown in FIG. 3(b), a core layer 3k having a cross section in which six limb-shaped portions e extend from a circular circumference, as shown in FIG. 3(c), and a core layer 3m having a cross section in which a total of six limb-shaped portions extend from an apex and each side of a triangle as shown in FIG. 3(d). The cross-sectional shape of the core layer 3 is not limited to the above-mentioned cross-sectional shapes, and may be an indefinite cross-sectional shape. Similarly, the cross-sectional shape of the through hole 4 of the foamed core layer 3 is usually circular, but have various shapes as necessary, as shown in FIG. 2(a) to 2(h) and 3(a) to 3(d).

It is preferred that the average hole diameter d of the through holes of the expanded beads of the present invention is 1 to 3 mm. When the average hole diameter d is within this range, it becomes easier to adjust the voidage of the expanded beads molded article to a desired range. For this reason, the average hole diameter d is more preferably 1.2 to 2.5 mm.

It is also preferred that the average outer diameter D of the expanded beads is preferably 1.5 to 7 mm. When the average outer diameter D is within this range, excellent filling property is obtainable so that a good expanded beads molded article may be obtained. For this reason, the average outer diameter D of the expanded beads is more preferably 2 to 6 mm, still more preferably 3 to 5 mm.

The average hole diameter d of the through holes of the expanded beads is determined as follows. First, an expanded bead is cut perpendicular to the penetrating direction of the through hole at a position where the area of the cut surface is maximum. A photograph of the obtained cut surface of the expanded bead is taken. The area of the through hole portion in the photograph (that is, the cross-sectional area of the through hole) is determined. The diameter of a virtual perfect circle having the same area as the determined area is calculated. The calculated value represents the hole diameter of the through hole of the expanded bead. The above measurement is performed on 50 expanded beads, and the arithmetic mean value is the average hole diameter d of the expanded beads.

The average outer diameter D of the expanded beads is determined as follows. First, an expanded bead is cut perpendicularly to the penetrating direction of the through hole at a position where the area of the cut surface is maximum. A photograph of the cut surface of the obtained expanded bead is taken. The area of the expanded bead in the photograph (that is, the cross-sectional area of the expanded bead including the cross-sectional area of the through hole) is determined. The diameter of a virtual perfect circle having the same area as the determined area is calculated. The calculated value represents the outer diameter of the expanded bead. The above measurement is performed on 50 randomly selected expanded beads, and the arithmetic mean value is the average outer diameter D of the expanded beads.

It is preferred that the average wall thickness t of the expanded beads of the present invention is 0.8 to 2 mm. When the average wall thickness t is within this range, the expanded beads are less likely to be crushed by an external force, since the wall thickness of the expanded beads is thick. Therefore, the expanded beads located on a surface of the molded article are less likely to be chipped. For this reason, the average wall thickness t of the expanded beads 2 is more preferably 0.9 to 1.5 mm, still more preferably 1.0 to 1.4 mm.

Conventionally, in the case of thick expanded beads, the hole diameter of the through hole is liable to become small, so that it tends to be difficult to obtain a molded article having a high voidage. According to the expanded beads of the present invention, it is possible to obtain a molded article having a high voidage in a wide molding pressure range even if the expanded beads are thick.

The average wall thickness t of the expanded beads is determined by the following formula:

$$t=(D-d)/2$$

where d and D are as defined above.

It is also preferred that a ratio t/d of the average wall thickness t to the average hole diameter d of the through holes is 0.4 to 1, more preferably 0.6 to 0.9. When the ratio t/d is within this range, the difference in compression characteristics of the expanded beads between in the penetrating direction of the through hole and in the direction perpendicular to the through hole becomes small, so that it is possible to obtain an expanded beads molded article having compression characteristics that are well-balanced as a whole.

It is further preferred that the average length L of the expanded beads is 2 to 7 mm. The average length L of the expanded beads is calculated as follows. Fifty expanded beads are selected at random and each measured for its maximum length of the through hole in the penetrating direction using a caliper. The average length L is the arithmetic mean of the obtained 50 measured values. It is further preferred that a ratio L/D of the average length L to the average outer diameter D of the expanded beads 2 is 0.5 to 2, more preferably 1 to 1.5, for reasons that filling efficiency thereof into a mold at the time of in-mold molding is excellent so that fusion bondability between the expanded beads is excellent.

Incidentally, the average hole diameter d, the average outer diameter D and the average wall thickness t of the expanded beads may be determined in the same manner as the measurement method for the expanded beads, even when the expanded beads are formed into an expanded beads molded article. Specifically, expanded beads forming the expanded beads molded article are sampled, and a photograph of a cross section in a direction perpendicular to the through hole is taken. From the photograph necessary measurement may be performed using an image analysis software or the like.

The bulk density and the average cell diameter of the expanded beads of the present invention will be described next. In the present invention, the bulk density of the expanded beads is preferably 15 to 50 kg/m$^3$, more preferably 20 to 40 kg/m$^3$ for reasons that it is easy to achieve both light weight and rigidity of the molded article.

The bulk density is measured as follows. Expanded beads are selected at random from a given expanded beads group and placed in a graduated cylinder having a volume of 1 L in such a way that a large number of expanded beads are accommodated therein up to a scale of 1 L in a naturally sedimented state, while removing static electricity. Next, the weight of the accommodated expanded beads is measured. The bulk density (kg/m$^3$) of the expanded beads is calculated by dividing the weight (g) of the expanded beads by the accommodated volume (1 L) with suitable conversion of the units. The measurement is carried out under an atmospheric pressure at 23° C. and 50% relative humidity.

It is preferred that the expanded bead of the present invention have an average cell diameter of 50 µm to 900 µm from the standpoint of excellent moldability, rigidity, dimensional stability and the like. For this reason, the average cell diameter is more preferably 80 µm to 500 µm, still more preferably 100 µm to 250 µm.

As used herein, the average cell diameter of the expanded bead is measured in the following manner. An expanded bead is bisected and the cross-section is photographed with a microscope such that the entire cross section can be seen. On the obtained photograph a straight line is drawn such that the cross section is nearly bisected. And a value obtained by dividing a length of a segment thereof from the periphery of the expanded bead to the opposite periphery thereof (excluding the through hole part) by a number of all cells intersecting with the line segment is defined as the average cell diameter of the expanded bead. The above operation is performed on randomly selected 20 expanded beads, and the value obtained by arithmetically averaging the average cell diameters of the 20 expanded beads is defined as the average cell diameter of the expanded bead.

The method for producing the expanded beads of the present invention will be described next. The expanded beads of the present invention may be produced by preparing multilayer resin particles (or pellets) each having a core layer with a cylindrical shape and a cover layer, the cylindrical layers of the obtained multilayer resin particles being then expanded. In this case, it is possible to suppress the expansion of the cover layers in the expansion step of the multilayer resin particles by making the thickness of the cover layers of the multilayer resin particles smaller than the above-described average cell diameter of the expanded beads.

Figure 2:
FIG. 2(a) is a schematic cross-sectional view showing an example of a foamed core layer of the present invention.
FIG. 2(b) is a schematic cross-sectional view showing another example of a foamed core layer.
FIG. 2(c) is a schematic cross-sectional view showing a further example of a foamed core layer.
FIG. 2(d) is a schematic cross-sectional view showing a further example of a foamed core layer of the present invention.
FIG. 2(e) is a schematic cross-sectional view showing a further example of a foamed core layer.
FIG. 2(f) is a schematic cross-sectional view showing a further example of a foamed core layer.
FIG. 2(g) is a schematic cross-sectional view showing a further example of a foamed core layer.
FIG. 2(h) is a schematic cross-sectional view showing a further example of a foamed core layer.
Figure 2:
Figure 2:
Figure 2:
Figure 2:
Figure 2:
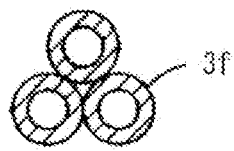
Figure 2:
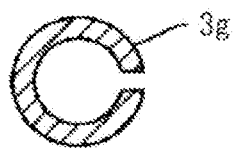
Figure 2:
Figure 3A:
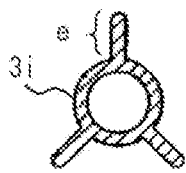
FIG. 3(a) is a schematic cross-sectional view showing a further example of a foamed core layer.
Figure 3B:
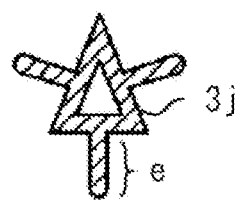
FIG. 3(b) is a schematic cross-sectional view showing a further example of a foamed core layer.
Figure 3C:
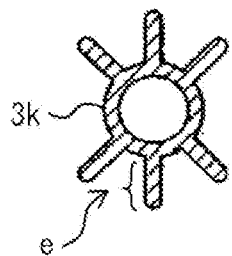
FIG. 3(c) is a schematic cross-sectional view showing a further example of a foamed core layer.
Figure 3D:
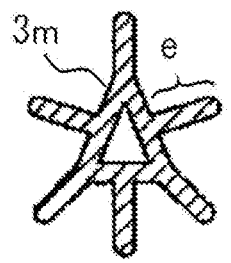
FIG. 3(d) is a schematic cross-sectional view showing a further example of a foamed core layer.
Figure 4:
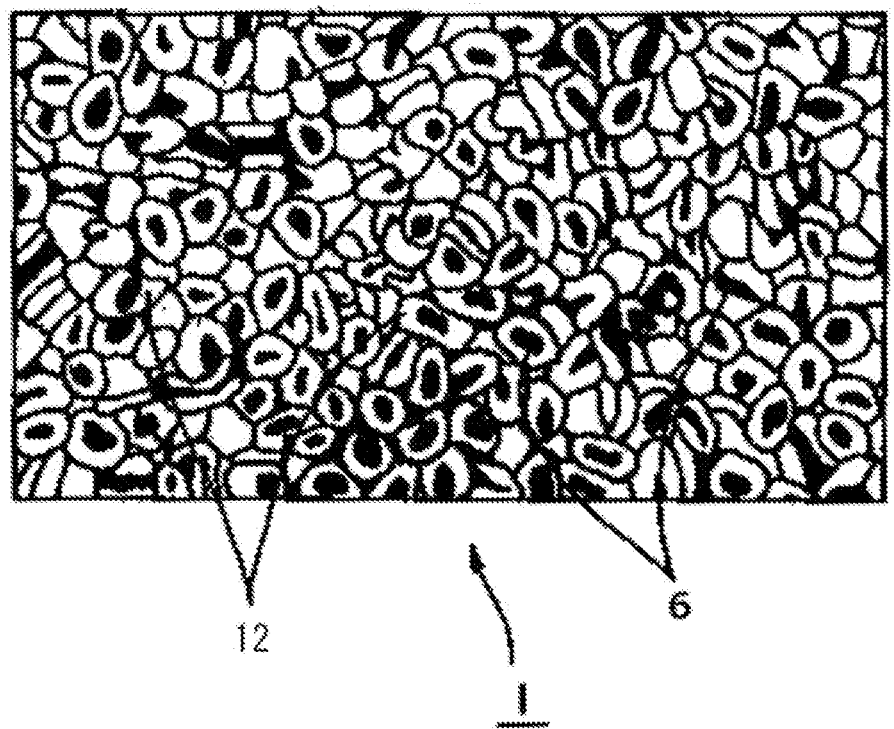
FIG. 4 is a schematic diagram showing an example of the state of a surface of an expanded beads molded article of the present invention having interconnected voids.

The multilayer resin beads may be produced by a known method, for example, a method wherein, as described in Japanese Unexamined Patent Publication No. H08-108441, a resin particle production process in which a die having a nozzle shape similar to the cross-sectional shape shown in FIGS. 2 and 3 of the present specification is employed, is combined with a production process of resin beads having a core layer and a cover layer in which a coextrusion process is employed as described in Japanese Examined Patent Publication No. S41-16125, Japanese Examined Patent Publication No. S43-23858 B, JP 44-29522 B, Japanese Examined Patent Publication No. S60-185816 A, etc.

Multilayer resin particles are produced, for example, by the following way. A core layer-forming extruder and a cover layer-forming extruder are used. Outlets of both extruders are connected to a coextrusion die. Desired resins and an additive to be blended as necessary are melted and kneaded in the core layer-forming extruder, and desired resins and an additive used as necessary are also melted and kneaded in the cover layer-forming extruder. The respective melt-kneaded materials are combined within the die installed at tips of the extruders to form a resin having a multi-layered structure composed of a core layer and a cover layer covering the outer surface of the core layer, which is then coextruded from the die provided with a head having a desired cross-sectional shape into strands. The strands are cut with a pelletizer so that tubular shaped, multi-layered resin particles each having a predetermined weight are produced.

As the shape of the multilayer resin particles used in the present invention, there may be mentioned a tubular shape such as a cylindrical shape, an elliptical tubular shape, a rectangular tubular shape, or a conjugated shape of tubes. The expanded beads obtained by expanding such multilayer resin particles have a shape generally corresponding to the shape of the resin particles before the expansion.

The average weight per one particle of the multilayer resin particles is preferably 0.05 mg to 10.0 mg, particularly preferably 0.1 mg to 5.0 mg. With regard to the average weight per one bead of the expanded beads, it is preferred that the average weight of the expanded beads per one bead is 0.05 mg to 10.0 mg, particularly 0.1 mg to 5.0 mg in order to improve the filling efficiency into a mold and the fusion property between the expanded beads at the time of in-mold molding. The average weight per one bead of the expanded beads may be controlled by adjusting the average weight per one particle of the multilayer resin particles, from which the expanded beads are produced, to the aimed average weight per one bead of the expanded beads.

In the multilayer resin particles of the present invention, the weight ratio of the core layer to the cover layer (core layer:cover layer) is preferably 99.5:0.5 to 75:25, more preferably 98:2 to 80:20, still more preferably 96:4 to 90:10. When the weight ratio of the cover layer of the multilayer resin particles is within the above range, the fusion property of the obtained expanded beads at the time of in-mold molding is ensured so that the mechanical properties of the obtained expanded beads molded article become good.

Regarding the thickness of the cover layer of the multilayer resin particles of the present invention, it is preferred that the thickness is thin for reasons that bubbles are prevented from forming in the cover layer when the multilayer resin particles are foamed so that the mechanical properties of the finally obtained expanded beads molded article are improved. On the other hand, in consideration of the effect of improving the fusion property of the obtained expanded beads, it is desirable to set the lower limit thereof. Specifically, the thickness of the cover layer of the multilayer resin particles is preferably 1 μm to 50 μm, more preferably 2 μm to 20 μm, still more preferably 3 μm to 10 μm.

The thickness of the cover layer of the multilayer resin particles is measured in the following manner. A multilayer resin particle is bisected such that the entire circumference of the obtained cross-section is surrounded by the cover layer. The measurement is performed on a photograph in which the cross-section is magnified and photographed with a microscope such that entire cross-section can be seen. Specifically, on the obtained photograph a straight line is drawn such that the cross section is nearly bisected, and another straight line perpendicular to the straight line and passing through a center portion of the resin particle is drawn. The lengths of the four portions of these straight lines that pass through the cover layer are measured. The arithmetic mean of the measured lengths represents the thickness of the cover layer of the multilayer resin particle. The above operation is performed on 10 randomly selected multilayer resin particles, and the value obtained by arithmetically averaging the thicknesses of the cover layers of the 10 multilayer resin particles is the thickness of the cover layer of the multilayer resin particles in the present specification. The thickness of the cover layer of the expanded beads may be also measured by the similar method. When it is difficult to determine the thickness of the cover layer of the multilayer resin particles or the expanded beads, measurement may be done by using multilayer resin particles in which a colorant has been added in advance to the resin constituting the cover layer thereof.

The expanded beads of the present invention may be produced by a method which includes dispersing the above-mentioned multilayer resin particles composed of the core layer and the cover layer in an aqueous medium (generally water) within a pressurizable closed vessel (for example, an autoclave), adding a dispersing agent thereto, injecting a required amount of a blowing agent thereinto, stirring under a high temperature and a high pressure to impregnate the multilayer resin particles with the blowing agent to form expandable multilayer resin particles, and releasing the expandable multilayer resin particles together with the aqueous medium into a zone having a lower pressure than the inside pressure of the vessel (generally under atmospheric pressure) to foam and expand the particles (this method is hereinafter referred to as a dispersion medium release foaming method).

The method for obtaining the expanded beads of the present invention is not limited to the dispersion medium release foaming method. For example, it is possible to adopt a method which includes foaming and expanding resin particles of a base material composed of a resin composition (a) for forming the core layer to obtain expanded beads, and coating the obtained expanded beads with a resin powder formed of the resin (b).

Further, in case where expanded beads having a particularly low apparent density (high expansion ratio) is to be obtained, such low apparent density expanded beads may be obtained by a method which includes aging the expanded beads obtained by the above method under atmospheric pressure in a usually adopted manner, then placing them in a pressurizable vessel, subjecting them to a pressurizing treatment by feeding under pressure a gas such as air into the vessel, thereby increasing the inside pressure of the expanded beads, taking the obtained expanded beads out of the vessel, and heating them with steam or hot air to expand them again (this method is hereinafter referred to as a two-stage foaming method).

The blowing agent is preferably a physical blowing agent. The physical blowing agent is not particularly limited, but may be, for example, an organic physical blowing agent such as aliphatic hydrocarbons, e.g., n-butane, i-butane, a mixture thereof, n-pentane, i-pentane and n-hexane and halogenated hydrocarbons, e.g., ethyl chloride, 2,3,3,3-tetrafluoro-1-propene and trans-1,3,3,3-tetrafluoro-1-propene; and an inorganic physical blowing agent such as carbon dioxide, nitrogen, air and water. These can be used singly or in admixture of two or more. When an organic physical blowing agent or a combination an inorganic physical blowing agent and an organic physical blowing agent is used, it is preferable to use n-butane, i-butane, n-pentane, i-pentane as the organic physical blowing agent because of their excellent compatibility with an olefin resin and foamability.

Among these blowing agents, it is preferable to use a blowing agent containing an inorganic physical blowing agent such as carbon dioxide, nitrogen and air, more preferably carbon dioxide, as a main ingredient. As used herein, "inorganic physical blowing agent as a main ingredient" is intended to mean that the inorganic physical blowing agent is contained in an amount of 50 mol % or more, preferably 70 mol % or more, still more preferably 90 mol % or more, in 100 mol % of the total physical blowing agent.

The amount of the physical blowing agent added is selected as appropriate according to the type of propylene-based resin, the type of the blowing agent, the apparent density of the desired expanded beads and so on, and may not be unconditionally limited. When carbon dioxide is used as the physical blowing agent, for example, the using amount thereof is 0.1 parts by weight to 30 parts by weight, preferably 0.5 parts by weight to 15 parts by weight, still more preferably 1 part by weight to 10 parts by weight, based on 100 parts by weight of the propylene-based resin.

As the dispersing agent, there may be used a water-insoluble inorganic substance such as aluminum oxide, tricalcium phosphate, magnesium pyrophosphate, zinc oxide, kaolin and mica, and a water-soluble polymeric protective colloid such as polyvinylpyrrolidone, polyvinyl alcohol and methyl cellulose. Further, an anionic surfactant such as sodium dodecylbenzene sulfonate and sodium alkane sulfonate may also be used.

When the foamable multilayer resin particles are released from the closed vessel together with the dispersing medium, it is preferred that pressure control is done by applying a pressure (back pressure) to the closed vessel with carbon dioxide, nitrogen, etc. so as to make the pressure inside the opened vessel constant or gradually increased.

In the expansion step, a heating rate of 0.5° C./min to 5° C./min is generally employed.

The process for producing expanded beads of the present invention includes a step of forming a so-called high temperature peak, in which, before expanding the foamable multilayer resin particles, the multilayer resin particles are heat treated by being held in the dispersion medium in a specific temperature range. The heat treatment may be performed at any of the time points before, during and after the impregnation of the blowing agent and may be also performed over these two or more time points. Through this heat treatment, expanded beads having a crystal structure showing a main endothermic melting peak (intrinsic peak) derived from crystals intrinsic to the polypropylene resin composition (a) and a melting peak (high temperature peak) located on the higher temperature side than the intrinsic peak may be obtained. The heat treatment is carried out, for example, as follows. The resin particles are held at a temperature near the melting point (Tm) of the polypropylene-based resin composition (a), which is the base resin of the multilayer resin particles, more specifically at an arbitrary temperature within the range of not lower than a temperature (Tm−15° C.) which is lower by 15° C. than the melting point and a temperature lower than the melting end temperature (Te) for a sufficient time (preferably about 5 to 60 minutes). By this, a part or all of the crystals intrinsic to the polypropylene-based resin composition (a) are melted and part of the melted crystals are recrystallized to produce high-potential crystals of thick lamellae. By subsequently expanding the foamable multilayer resin particles having the high potential crystals at the expansion temperature, expanded beads having a crystal structure that has crystals (intrinsic crystals) formed by crystallization of the melted crystals as a result of the cooling during the expansion and the high potential crystals showing a peak on the high temperature side.

The expanded beads may be obtained by subsequently releasing the foamable resin particles into a low-pressure atmosphere. The temperature of the contents in the closed vessel at the time the foamable resin particles are discharged from the closed vessel together with the aqueous dispersing medium, that is, the temperature at which the foamable resin particles are expanded (expansion temperature) is preferably in the range from a temperature lower by 15° C. than the melting point (Tm) of the polypropylene-based resin composition (a) (Tm−15° C.) to a temperature higher by 10° C. than the melting completion temperature (Te+10° C.). The difference between the pressure in the closed vessel and the pressure in the discharging atmosphere is preferably 1.0 MPa to 7.0 MPa, more preferably 1.5 MPa to 5.0 MPa.

In the dispersion medium release foaming method, the ratio (intrinsic peak calorific value/high temperature peak calorific value) may be controlled to 3.5 or more by adjusting the expansion temperature to a high value, increasing the injection amount of the blowing agent, or the like.

The temperature range adjusted at the time of expansion of the resin particles described above is an appropriate temperature range when an inorganic physical blowing agent is used as the blowing agent. When an organic physical blowing agent is additionally used in combination, the appropriate temperature range tends to shift to a lower side than the above temperature range due to the plasticizing effect of the organic physical blowing agent on the base resin depending on the type and using amount thereof.

The polypropylene-based resin expanded beads molded article of the present invention will be next described. The expanded bead molded article is obtained by in-mold molding of the propylene-based resin expanded beads and has interconnected voids.

Figure 5:
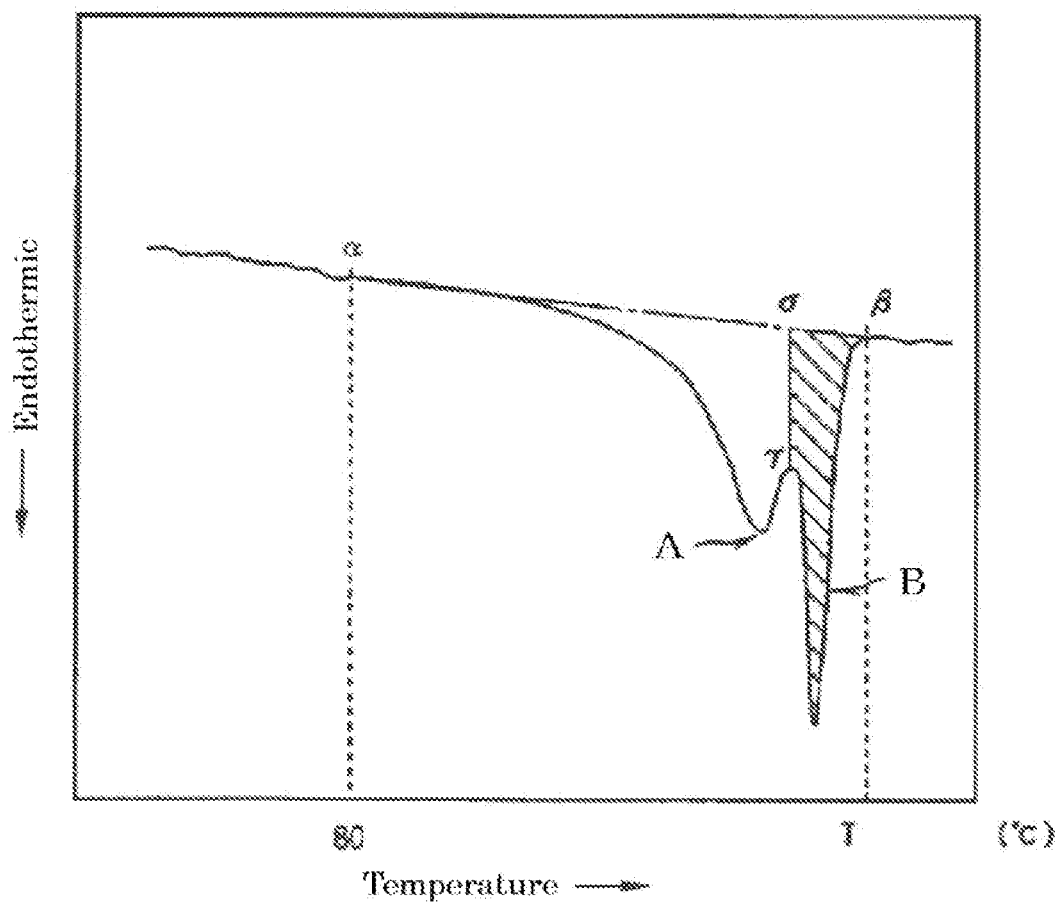
FIG. 5 is a schematic diagram showing an example of a first time DSC curve in the heat flux differential scanning calorimetry of the expanded beads of the present invention.

A schematic illustration of an example of the surface state of the expanded beads molded article of the present invention is shown in FIG. 5. FIG. 5 shows an expanded beads molded article 1 having a plurality of expanded beads 12 and interconnected voids 6. Thus, the propylene-based resin expanded beads molded article having the interconnected voids of the present invention has the voids 6 as shown in FIG. 5 and is obtained by in-mold molding of the propylene-based resin expanded beads.

As a method for producing an expanded beads molded article by molding the expanded beads of the present invention in a mold, there may be mentioned a known in-mold molding method.

One example is a cracking molding method in which a pair of molds are used for subjecting the expanded beads by in-mold molding. The expanded beads are filled in the mold cavity under an atmospheric pressure or a reduced pressure, and the mold is closed such that the volume of the mold cavity is reduced by 5% by volume to 50% by volume to compress the expanded beads. Then a heating medium such as steam is supplied into the mold to heat and fusion-bond the expanded beads (for example, Japanese Examined Patent Publication No. S46-38359). Molding may be also carried out by a pressure molding method in which the expanded beads are pressure-treated with a pressurized gas such as air to increase the pressure inside the expanded beads. The resulting expanded beads are then filled in a mold cavity under an atmospheric pressure or a reduced pressure and the mold is closed. A heating medium such as steam is then supplied into the mold to heat and fusion-bond the expanded beads (for example, Japanese Examined Patent Publication No. S51-22951). Further, molding may be performed by a compression filling molding method which includes pressurizing a mold cavity with a compressed gas to a pressure higher than the atmospheric pressure, then filling the expanded beads in the mold cavity while pressurizing them to that pressure or higher pressure than that, and then suppling a heating medium such as steam to the mold to heat and fusion bond the expanded beads (for example, Japanese Examined Patent Publication No. H4-46217). In addition, molding may be performed by an ambient pressure filling molding method in which expanded beads are filled in a mold cavity defined by a pair of molds under an ambient pressure. Then a heating medium such as steam is supplied to heat and fusion-bond the expanded beads (for example, Japanese Examined Patent Publication No. H6-49795). A method in which the above methods are combined may be also adopted (for example, Japanese Examined Patent Publication No. H6-22919).

It is preferred that the expanded beads molded article produced by in-mold molding of the expanded beads of the present invention has a density in the range of 15 to 50 kg/m³, more preferably 20 to 40 kg/m³ in order to achieve both light weight and rigidity.

The density (kg/m³) of the expanded beads molded article may be calculated by dividing the weight (g) of the molded article by the volume (L) determined from the external dimensions of the molded article with appropriate unit conversion.

The expanded beads molded article of the present invention preferably has a voidage of 20% or more. When the voidage is 20% or more, the expanded beads molded article shows excellent sound absorption, air permeability, water permeability, damping property and the like. Further, when the molded article is used as automobile parts, the effect of improving the adhesiveness to a polyurethane foam is obtainable. For these reasons, the voidage of the molded article is more preferably 22% or more, still more preferably 24% or more. The upper limit thereof is generally 40%, preferably 35%.

The voidage of the expanded beads molded article is determined as follows. A cuboid shape test piece cut out from the expanded beads molded article excluding the skin is submerged in a volume containing alcohol, and the true volume Vt (cm³) of the test piece is measured from the rise of the liquid level of the alcohol. Further, the apparent volume Va (cm³) is determined from the external dimensions of the test piece (length×width×height). From the obtained true volume Vt and the apparent volume Va, the voidage of the expanded beads molded article is calculated based on the following formula.

$$\text{Voidage (\%)} = [(Va - Vt)/Va] \times 100$$

It is preferred that the expanded beads molded article of the present invention has a 50% compressive stress of 120 to 300 kPa, more preferably 150 to 250 kPa, still more preferably 185 to 240 kPa, because of excellent balance between the rigidity and cushioning property of the molded article. When the 50% compressive stress is within the above range, generation of rubbing noise is more likely to be suppressed when the molded article is used as an automobile member. The 50% compressive stress is a measure of the stiffness of the foam molding.

The 50% compressive stress of the expanded beads molded article is measured as follows.

A test piece of 50 mm in length×50 mm in width×25 mm in thickness is cut out from the expanded beads molded article in such a manner that the skin layer is excluded therefrom and is measured for the compressive stress (MPa) at 50% strain when compressed at a rate of 10 mm/min based on JIS K 6767(1999).

The expanded beads of the present invention which are excellent in fusion property therebetween permit in-mold molding in a wider range of molding vapor pressure as compared with the conventional expanded beads. The obtained expanded beads molded article has a high voidage, has desired properties owing to its interconnected voids, such as air permeability, water permeability, sound absorbing property, sound deadening property, vibration isolation property, etc., and is excellent in mechanical properties. For these reasons, the article may be suitably used as a drainage material, a wall material in buildings, an automobile interior material, a cushioning material, etc. Further, because of its excellent adhesiveness to polyurethane foam, the article is suitably used as an automobile member such as an automobile seat member.

EXAMPLES

The present invention will be next described in more detail by way of examples. However, the present invention is not limited to the examples in any way.

The resins shown in Table 1 were used in Examples and Comparative Examples.

TABLE 1

| | Abbreviation | Kind | Catalyst | Bending modulus (MPa) | Melting point (° C.) | Comonomer content (wt %) | MFR (g/10 min) | Heat of fusion (J/g) |
|---|---|---|---|---|---|---|---|---|
| Foamed Core Layer | Resin PP1 | Resin 1 | r-PP | Ziegler-Natta | 980 | 142 | Ethylene 3.1 wt % | 8 | 70 |

TABLE 1-continued

|  | Abbreviation | Kind | Catalyst | Bending modulus (MPa) | Melting point (° C.) | Comonomer content (wt %) | MFR (g/10 min) | Heat of fusion (J/g) |
|---|---|---|---|---|---|---|---|---|
|  | Resin 2 | r-PP | Metallocene | 940 | 136 | Ethylene 2.8 wt % | 7 | 67 |
| Resin PP2 | Resin 3 | r-PP | Ziegler-Natta | 1470 | 152 | Ethylene 1.1 wt % | 7 | 85 |
| Cover Layer | Resin 4 | LLDPE | Metallocene | 110 | 100 | Not measured | 10 | — |

The melting point and the heat of fusion in Table 1 were measured as follows.

A test piece of 2 mg of the pellet-shaped base resin was heated from 30° C. to 200° C. at a heating rate of 10° C./min, then cooled to 30° C. at a cooling rate of 10° C./min and again heated from 30° C. to 200° C. at a heating rate of 10° C./min to obtain a DSC curve according to the heat flux differential scanning calorimetry method described in JIS K7121(2012). The peak top temperature of the endothermic was defined as the melting point of the resin. Further, the area of the endothermic peak was defined as the heat of fusion of the resin. As the measuring device, a heat flux differential scanning calorimetry device (DSC Q1000 manufactured by TA Instruments Inc.) was used.

The flexural modulus of the resin in Table 1 was measured according to JIS K7171(2008). The resin was heat-pressed at 230° C. to prepare a 4 mm sheet, from which was cut out a test piece having a length of 80 mm, a width of 10 mm, and a thickness of 4 mm (standard test piece). The radius R1 of the indenter and the radius R2 of the support were both 5 mm, the distance between the fulcrums was 64 mm, and the test speed was 2 mm/min.

The MFR in Table 1 was measured by the method described previously. Specifically, according to JIS K7210-1(2014), the measurement was carried out under the conditions including a temperature of 230° C. and a load of 2.16 kg in the case of the polypropylene-based resin and conditions including a temperature of 190° C. and a load of 2.16 kg in the case of the polyethylene-based resin.

Cell Controlling Agent Master Batch:

Use was made of a cell controlling agent master batch prepared by blending 90% by weight of a polypropylene-based resin with 10% by weight of zinc borate.

Multilayer resin particles were prepared in Examples and Comparative Examples with the use of the following devices. An extruder having an inner diameter of 100 mm and L/D of 32 was used as an extruder for forming a foamed core layer, and an extruder having an inner diameter of 25 mm and L/D of 32 was used as an extruder for forming a cover layer. The outlets of the foamed core layer forming extruder and the cover layer forming extruder were connected to an annular die for coextrusion such that the respective resin melts were able to be laminated in the coextrusion annular die.

Examples 1 to 5 and Comparative Examples 1 to 5

Production of Multilayer Resin Particles:

The resin for forming a foamed core layer shown in Tables 2 and 3 and the blowing agent master batch were supplied to the first extruder in such a proportion that the master batch was 5 parts by weight per 100 parts by weight of the resin for forming the core layer, and melt-kneaded therein to obtain a resin melt for forming the foamed core layer. At the same time, the resin for forming a cover layer shown in Tables 2 and 3 was supplied to the third extruder and melt-kneaded therein to obtain a resin melt for forming the cover layer. The resin melt for forming the foamed core layer and the resin melt for forming the cover layer were introduced into the coextrusion die and laminated such that the resin melt for forming the cover layer surrounded the resin melt for forming the foamed core layer so that the weight proportion of the cover layer was as shown in Tables 2 and 3. The laminate was coextruded from the small holes of the coextrusion die attached to the tips of the extruders into a multilayer strands in which a cover layer was provided on the outer periphery of the tubular core layer having a through-hole. The strands were then cooled with water, cut with a pelletizer to a weight of about 1.5 mg and dried to give multilayer resin particles. In the above preparation of the multilayer resin particles, the hole diameter of the die was adjusted so that the average outer diameter D0, the average hole diameter d0, and the average wall thickness t0 of the resin particles had the values shown in Tables 2 and 3. The average outer diameter D0, average hole diameter d0, and average wall thickness t0 of the resin particles were measured in the same manner as that for the above-mentioned average outer diameter D, average hole diameter d, and average wall thickness t of the expanded beads.

TABLE 2

|  |  |  |  |  | Example | | | | |
|---|---|---|---|---|---|---|---|---|---|
|  |  |  |  |  | 1 | 2 | 3 | 4 | 5 |
| Resin Particles | Resin for forming foamed core layer (resin composition (a)) | Resin PP1 | Resin 1 | wt % | 80 | 80 | 95 | 90 | 80 |
|  |  |  | Resin 2 | wt % | — | — | — | — | — |
|  |  | Resin PP2 | Resin 3 | wt % | 20 | 20 | 5 | 10 | 20 |
|  | Resin for forming cover layer |  | Resin 4 | wt % | 100 | 100 | 100 | 100 | 100 |
|  | Weight percentage of cover layer in resin particles |  |  | wt % | 5 | 5 | 5 | 5 | 5 |

TABLE 2-continued

|  |  |  | Example | | | | |
| --- | --- | --- | --- | --- | --- | --- | --- |
|  |  |  | 1 | 2 | 3 | 4 | 5 |
| Melting point MP2 − Melting point MP1 | | °C. | 10 | 10 | 10 | 10 | 10 |
| Average outer diameter D0 | | mm | 1.07 | 1.07 | 1.05 | 1.06 | 1.13 |
| Average hole diameter d0 | | mm | 0.50 | 0.50 | 0.48 | 0.5 | 0.65 |
| Average wall thickness t0 | | mm | 0.29 | 0.29 | 0.29 | 0.28 | 0.24 |
| t0/d0 | | — | 0.56 | 0.56 | 0.58 | 0.56 | 0.37 |

TABLE 3

|  |  |  |  |  | Comparative Example | | | | |
| --- | --- | --- | --- | --- | --- | --- | --- | --- | --- |
|  |  |  |  |  | 1 | 2 | 3 | 4 | 5 |
| Resin Particles | Resin for forming foamed core layer (resin composition (a)) | Resin PP1 | Resin 1 | wt % | 100 | 100 | 60 | — | 80 |
|  |  |  | Resin 2 | wt % | — | — | — | 80 | — |
|  |  | Resin PP2 | Resin 3 | wt % | — | — | 40 | 20 | 20 |
|  | Resin for forming cover layer | | Resin 4 | wt % | 100 | 100 | 100 | 100 | 100 |
|  | Weight percentage of cover layer in resin particles | | | wt % | 5 | 5 | 5 | 5 | 5 |
|  | Melting point MP2 − Melting point MP1 | | | °C. | — | — | 10 | 16 | 10 |
|  | Average outer diameter D0 | | | mm | 1.05 | 1.05 | 1.07 | 1.03 | 1.13 |
|  | Average hole diameter d0 | | | mm | 0.48 | 0.48 | 0.5 | 0.46 | 0.65 |
|  | Average wall thickness t0 | | | mm | 0.29 | 0.29 | 0.29 | 0.29 | 0.24 |
|  | t0/d0 | | | — | 0.59 | 0.59 | 0.57 | 0.64 | 0.37 |

Production of Expanded Beads:

Next, using the above multilayer resin particles, propylene-based resin expanded beads were produced.

First, 1 kg of the multilayer resin particles obtained as described above were charged in a 5 L closed vessel equipped with a stirrer together with 3 L of water as a dispersion medium, into which 0.3 part by weight of kaolin as a dispersing agent, 0.004 part by weight (active ingredient amount) of a surfactant (trade name: NEOGEN S-20F, manufactured by Daiichi Kogyo Seiyaku Co., Ltd., sodium alkylbenzene sulfonate), and carbon dioxide as the blowing agent were injected such that the pressure ($CO_2$ injection pressure) was as shown in Tables 4 and 5.

Then, with stirring, the temperature of the dispersion medium was raised to the "expansion temperature minus 5° C." shown in Tables 4 and 5, and maintained at that temperature for 15 minutes. Then, the temperature was raised to the expansion temperature shown in Tables 4 and 5 and held at that temperature for 15 minutes, Subsequently, while applying the back pressure shown in Tables 4 and 5 with carbon dioxide, the contents were released to the atmospheric pressure to obtain generally cylindrical expanded beads having through holes. The physical properties of the obtained expanded beads are shown in Tables 4 and 5.

The amount of the dispersing agent and the surfactant added (parts by weight) is an amount based on 100 parts by weight of the propylene-based resin particles.

TABLE 4

|  |  |  | Example | | | | |
| --- | --- | --- | --- | --- | --- | --- | --- |
|  |  |  | 1 | 2 | 3 | 4 | 5 |
| Foaming Conditions | Foaming temperature | °C. | 152.1 | 151.8 | 148.9 | 150.1 | 151.8 |
|  | Injection pressure of $CO_2$ | MPa(G) | 3.60 | 3.60 | 3.70 | 3.65 | 3.50 |
|  | Back pressure | MPa(G) | 3.53 | 3.4 | 3.75 | 3.68 | 3.40 |
| Expanded Beads | Bulk density | kg/m³ | 22 | 22 | 22.5 | 23.1 | 22 |
|  | Melting point | °C. | 145.6 | 145.6 | 143.3 | 144.1 | 145.6 |
|  | Total heat of fusion | J/g | 68.7 | 68.7 | 66.3 | 67.5 | 68.7 |
|  | Heat of fusion of intrinsic peak ΔHm | J/g | 54.9 | 53.5 | 52.1 | 53.4 | 54.9 |
|  | Heat of fusion of high temperature peak ΔHh | J/g | 13.8 | 15.2 | 14.2 | 14.1 | 13.8 |
|  | ΔHm/ΔHh | — | 3.98 | 3.52 | 3.67 | 3.79 | 3.98 |
|  | Average outer diameter D | mm | 3.94 | 3.90 | 3.7 | 3.7 | 3.72 |
|  | Average hole diameter d | mm | 1.59 | 1.60 | 1.40 | 1.45 | 1.96 |
|  | Average wall thickness t | mm | 1.17 | 1.15 | 1.12 | 1.15 | 0.88 |
|  | t/d | — | 0.74 | 0.72 | 0.80 | 0.79 | 0.45 |

TABLE 5

| | | | Comparative Example | | | | |
|---|---|---|---|---|---|---|---|
| | | | 1 | 2 | 3 | 4 | 5 |
| Foaming Conditions | Foaming temperature | °C. | 147.5 | 148.2 | 154.1 | 148.6 | 151.6 |
| | Injection pressure of $CO_2$ | MPa (G) | 3.80 | 3.6 | 3.30 | 3.7 | 3.60 |
| | Back pressure | MPa (G) | 3.70 | 3.5 | 3.32 | 3.62 | 3.5 |
| Expanded Beads | Bulk density | kg/m$^3$ | 22.5 | 22.5 | 22.5 | 23.1 | 22.5 |
| | Melting point | °C. | 142.5 | 142.5 | 149.1 | 141.4 | 145.6 |
| | Total heat of fusion | J/g | 64.5 | 64.2 | 76.3 | 65.0 | 71.2 |
| | Heat of fusion of intrinsic peak $\Delta Hm$ | J/g | 49.8 | 51.0 | 62.2 | 50.7 | 54.3 |
| | Heat of fusion of high temperature peak $\Delta Hh$ | J/g | 14.7 | 13.2 | 14.1 | 14.3 | 16.9 |
| | $\Delta Hm/\Delta Hh$ | — | 3.39 | 3.86 | 4.41 | 3.55 | 3.21 |
| | Average outer diameter D | mm | 3.70 | 3.80 | 3.9 | 3.64 | 3.80 |
| | Average hole diameter d | mm | 1.40 | 1.45 | 1.55 | 1.43 | 1.50 |
| | Average wall thickness t | mm | 1.15 | 1.20 | 1.20 | 1.11 | 1.15 |
| | t/d | — | 0.82 | 0.83 | 0.77 | 0.77 | 0.77 |

The obtained expanded beads had a tubular shape as shown in FIG. 1. Observation of the cross section thereof with an optical microscope revealed that the resin constituting the foamed core layer foamed well to form a closed cell structure while the resin constituting the cover layer did not foam.

The average inner diameter d of the through holes and the average outer diameter D of the expanded beads were measured by the method described previously. In the measurement of the average inner diameter d of the through-holes of the expanded beads, an expanded bead was first cut in a direction perpendicular to the penetration direction of through-hole at a position where the area of the cut surface was maximum. A photograph of the obtained cut surface of the expanded bead was taken. The area of the through hole portion in the photograph (that is, the cross-sectional area of the through hole) was determined. The diameter of a virtual perfect circle having the same area as the determined area was calculated. The calculated value represents the through hole diameter of the expanded bead. The above measurement was performed on 50 expanded beads, and the arithmetic mean value thereof was taken as the average hole diameter d of the expanded beads.

In the measurement of the average outer diameter D of the expanded beads, an expanded bead was first cut in a direction perpendicular to the penetrating direction of the hole at a position where the area of the cut surface was maximum. A photograph of the cut surface of the obtained expanded beads was taken. The area of the expanded bead in the photograph (that is, the cross-sectional area of the expanded bead including the cross-sectional area of the through hole) was determined. The diameter of a virtual perfect circle having the same area as the determined area was calculated. The calculated value represents the outer diameter of the expanded beads. The measurement was performed on 50 randomly selected expanded beads, and the arithmetic mean value thereof was taken as the average outer diameter D of the expanded beads. The average wall thickness t of the expanded beads was calculated based on (D-d)/2. The results are shown in Tables 4 and 5.

The bulk density of the expanded beads was measured by the method described previously. Specifically, expanded beads were taken randomly out from the expanded beads group and placed in a graduated cylinder having a volume of 1 L such that a large number of expanded beads were accumulated up to a scale of 1 L in a naturally deposited state. The mass W1 [g] of the accumulated expanded beads was measured. This operation was performed 5 times for different expanded bead samples. The bulk density of each expanded bead sample was calculated from each measurement values with unit conversion. The arithmetic mean of these calculated values was taken as the bulk density (kg/m$^3$) of the expanded beads.

The melting point of the expanded beads was measured by the method described previously. Specifically, using 3 mg of expanded beads as a test piece, the temperature was raised from 30° C. to 200° C. at a heating rate of 10° C./min, then lowered to 30° C. at a cooling rate of 10° C./min, and again raised from 30° C. to 200° C. at a heating rate of 10° C./min to obtain a DSC curve according to the heat flux differential scanning calorimetry method described in JIS K7121(2012). The peak temperature of the endothermic peak was determined and taken as the melting point of the expanded beads. As the measuring device, a heat flux differential scanning calorimetry device (DSC Q1000 manufactured by TA Instruments Inc.)

The high temperature peak calorific value and the intrinsic peak calorific value (low temperature peak calorific value) of the expanded beads were measured by a measuring method according to JIS K7122(2012) as described previously. First, about 3 mg of expanded beads were sampled and subjected to measurement in which the temperature was raised from 30° C. to 200° C. at 10° C./min using a heat flux differential scanning calorimetry device to obtain a DSC curve. The peak intrinsic to the resin was designated as A while the high temperature peak appearing on the higher temperature side was designated as B in the following description. A straight line ($\alpha$-$\beta$) connecting a point $\alpha$ on the DSC curve at 80° C. and a point $\beta$ on the DSC curve at an end temperature of melting T of the expanded beads was drawn. The end temperature of melting T is an intersection at which the DSC curve on a high temperature side of the high temperature peak B meets the base line. Next, a line which is parallel with the ordinate and which passes a point $\gamma$ on the DSC curve at the bottom of the valley between the intrinsic peak A and the high temperature peak B was drawn. The point at which this line crosses the line ($\alpha$-$\beta$) was designated as $\sigma$.

The area of the high temperature peak B is the area bounded by the curve of the high temperature peak B, the line segment ($\sigma$-$\beta$) and the line segment ($\gamma$-$\sigma$), and corresponds to the high temperature peak calorific value $\Delta Hh$. The area of the intrinsic peak is the area bounded by the curve of the resin intrinsic peak A, the line segment (α-β) and the line segment (γ-σ), and corresponds to the intrinsic peak calorific value ΔHm.

The total heat of fusion of the expanded beads was calculated by adding the high temperature peak calorific value and the main endothermic peak calorific value (intrinsic peak calorific value).

As the measuring device, a heat flux differential scanning calorimetry device (DSC Q1000 manufactured by TA Instruments Inc.) was used.

Production of Expanded Beads Molded Article:

In-mold molding of the expanded beads molded article was carried out using the obtained expanded beads.

First, the expanded beads were filled in a flat mold having a length of 300 mm, a width of 250 mm and a thickness of 60 mm. In-mold molding was performed by a pressure molding method using steam as a heating medium to obtain a flat plate-shaped expanded beads molded article.

The heating method during the in-mold molding was as follows. Preheating was conducted by supplying steam for 5 seconds while maintaining drain valves of both sides of the mold in an open state. One-direction flow heating was then carried out at a pressure lower by 0.04 MPa(G) than the molding vapor pressure shown in Tables 6 and 7. Further, reversed one-direction flow heating was performed at a pressure lower by 0.02 MPa(G) than that for the full heating. Thereafter, heating was performed with steam at the molding vapor pressure [MPa(G); gauge pressure] shown in Tables 5 to 7.

After completion of the heating, the pressure was released and water cooling was conducted until the value of a surface pressure gauge attached to the inner surface of the mold decreased to 0.04 MPa(G). The mold was then opened. The molded article was taken out of the mold cavity, aged in an oven at 60° C. for 12 hours, and then slowly cooled to obtain an expanded beads molded article. The physical properties of the obtained molded article are shown in Tables 6 and 7. In this way, flat plate-shaped expanded beads molded articles having a thickness of 60 mm and having interconnected voids were obtained. Tables 6 and 7 show the physical properties and fusion bondability evaluation of the expanded bead molded articles.

TABLE 6

| | | | Example | | | | | | | | |
|---|---|---|---|---|---|---|---|---|---|---|---|
| | | | 1 | | 2 | | 3 | | 4 | | 5 |
| In-Mold Molding | Vapor pressure range 1 | MPa(G) | 0.12-0.20 | | 0.12-0.20 | | 0.10-0.18 | | 0.12-0.20 | | 0.12-0.20 |
| | Vapor pressure range 2 | MPa(G) | 0.12-0.20 | | 0.12-0.20 | | 0.10-0.18 | | 0.12-0.20 | | 0.12-0.20 |
| | Cracking | % | 12 | | 12 | | 12 | | 12 | | 12 |
| Expanded Beads Molded Article | Molding vapor pressure | MPa(G) | 0.12 | 0.20 | 0.12 | 0.20 | 0.10 | 0.18 | 0.12 | 0.20 | 0.12 | 0.20 |
| | Density of molded article (with skin) | kg/m³ | 26.6 | 27.2 | 27 | 27 | 27 | 27 | 27 | 27 | 27 | 27 |
| | Shrinkage percentage | % | 1.8 | 2.3 | 1.8 | 2 | 2.0 | 2.3 | 2.0 | 2.3 | 1.8 | 2.3 |
| | Evaluation of fusion bonding | — | A | A | A | A | A | A | A | A | A | A |
| | Evaluation of recovery | — | A | A | A | A | A | A | A | A | A | A |
| | Density of molded article (without skin) | kg/m³ | 27.5 | 27.7 | 28 | 28 | 27.7 | 28 | 28 | 28 | 27.5 | 27.7 |
| | Compressive stress at 50% strain | kPa | 195 | 205 | 195 | 200 | 185 | 200 | 190 | 205 | 170 | 195 |
| | Voidage | % | 27 | 24 | 28 | 25 | 26 | 23 | 27 | 23 | 32 | 27 |

TABLE 7

| | | | Comparative Example | | | | | | |
|---|---|---|---|---|---|---|---|---|---|
| | | | 1 | 2 | | 3 | 4 | | 5 |
| In-Mold Molding | Vapor pressure range 1 | MPa(G) | 0.16-0.22 | 0.12-0.20 | | 0.18-0.24 | 0.12-0.20 | | 0.16-0.24 |
| | Vapor pressure range 2 | MPa(G) | — | 0.12-0.16 | | — | 0.12-0.16 | | — |
| | Cracking | % | 12 | 12 | | 12 | 12 | | 12 |
| Expanded Beads Molded Article | Molding vapor pressure | MPa(G) | 0.20 | 0.12 | 0.20 | 0.18 | 0.12 | 0.20 | 0.16 |
| | Density of molded article (with skin) | kg/m³ | 26.6 | 28.1 | 28.0 | 27 | 29.0 | 30.0 | 29 |
| | Shrinkage percentage | % | 2.0 | 2.0 | 2.5 | 1.8 | 2.0 | 2.1 | 1.8 |
| | Evaluation of fusion bonding | — | A | A | A | A | A | A | A |
| | Evaluation of recovery | — | A | A | A | A | A | A | A |
| | Density of molded article (without skin) | kg/m³ | 28 | 29 | 30 | 27.5 | 27.5 | 27.7 | 30 |
| | Compressive stress at 50% strain | kPa | 180 | 170 | 200 | 204 | 190 | 220 | 180 |
| | Voidage | % | 28 | 28 | 15 | 27 | 27 | 14 | 31 |

In Tables 6 and 7, "vapor pressure range 1" is a moldable range. Expanded beads molded articles are prepared at vapor pressures varied between 0.08 and 0.30 MPa (G) at 0.02 MPa (G) intervals. The prepared molded articles are evaluated for two items of fusion bondability and recoverability according to the criteria described below, and those molded articles which are evaluated as "A" in all the two items are regarded as acceptable. "Vapor pressure range 1" refers to a vapor pressure range which affords such acceptable articles. Expanded beads having a wider range of the moldable vapor pressure from the lower limit value to the upper limit value are regarded as having a wider moldable range and better mold-moldability. Further, expanded beads showing a lower value of the vapor pressure that can be molded are regarded as being better capable of being molded at a lower pressure and as having excellent in-mold moldability.

In Tables 6 and 7, "vapor pressure range 2" is a range capable of affording a high voidage molded article. The expanded beads molded articles prepared as above are further measured for their voidage. "Vapor pressure range 2" refers to a vapor pressure range which is within the above moldable range and which gives expanded bead molded articles having a voidage of 20% or more.

In Tables 6 and 7, the physical properties and evaluation were determined as follows.

Density of Expanded Beads Molded Article:

The density of the expanded beads molded article (with skin) was calculated by dividing the weight (g) of the molded article with a skin obtained by in-mold molding by the volume (L) determined from the external dimensions of the molded article. The measurement was carried out on the expanded beads molded article which had been aged for 48 hours under an atmospheric pressure at 23° C. and 50% relative humidity.

The voidage of the expanded beads molded article was determined by the method described previously. Specifically, a cuboid shape test piece of 20 mm in length, 100 mm in width and 20 mm in thickness cut out from the expanded beads molded article excluding the skin is submerged in a volume containing alcohol, and the true volume Vt (cm$^3$) of the test piece was measured from the rise of the liquid level of the alcohol. Next, the apparent volume Va (cm$^3$) was determined from the external dimensions of the test piece. From the obtained true volume Vt and the apparent volume Va, the voidage of the expanded beads molded article was determined according to the above-described formula (2).

Shrinkage Percentage:

The shrinkage percentage of the expanded beads molded article was measured as follows.

The shrinkage percentage [%] of the expanded beads molded article was determined by:

(300 [mm]−long side length [mm] of the molded article)/ 500 [mm]×100. The "300 [mm]" is a long side dimension of a molding die. The "long side length [mm] of the molded article" is a measured value obtained by a method in which the expanded beads molded article obtained in Examples and Comparative Examples is measured for its long side length after having been aged in an atmosphere at 80° C. for 12 hours, then slowly cooled, and then further aged for 6 hours in an atmosphere at 23° C.

Evaluation of Fusion Bondability of the Expanded Beads:

The expanded beads molded article was bent and fractured. The fracture surface thereof was observed to determine the material fracture rate (%) obtained by dividing the number of the broken expanded beads that were present on the fracture surface by the number of all expanded beads that were present on the fracture surface. The evaluation was made according to the following criteria.

A: The material fracture rate of the expanded beads is 90% or more when the expanded beads molded article was fractured;

B: The material destruction rate of the expanded beads is less than 90 when the expanded bead molded article was fractured.

Evaluation of Recoverability of the Expanded Beads:

In-mold molding was performed using a flat plate-shaped mold having a length of 300 mm, a width of 250 mm and a thickness of 60 mm. The obtained expanded beads molded article was measured for its thickness at near the four corners (spaced 10 mm from the corner toward the center) and the central part (bisecting portion in both the longitudinal direction and the lateral direction). Next, the ratio (%) of the thickness of the central part based on the thickness of the thickest part among the four corners was calculated. Evaluation A was assigned when the ratio was 90% or more, and evaluation B was assigned when the ratio was less than 90%.

Compressive Stress at 50% Strain:

A test piece having a length of 50 mm, a width of 50 mm and a thickness of 25 mm was cut out from a central portion of the expanded beads molded article excluding the skin thereof. A compression test was performed at a compression rate of 10 mm/min according to JIS K6767(1999) to measure the 50% compressive stress. The density of the test piece used for this measurement is shown in the table as the density of the expanded beads molded article (without skin). The density of the expanded beads molded article (without skin) was measured in the same manner as the measurement of the density of the expanded bead molded article, except that the test piece used was cut out from the molded article in such a way that the skin was removed.

With the expanded beads of the present invention used in the examples, expanded beads molded articles having a high voidage were able to be molded in a wide range of molding vapor pressures. Specifically, the expanded beads of the present invention permitted in-mold molding at a molding vapor pressure as low as about 0.12 MPa(G). Further, even under high pressure conditions including a molding vapor pressure of 0.20 MPa, an expanded beads molded article having a voidage of 20% or more was able to be obtained. The obtained molded articles were light in weight and had excellent rigidity.

Further, in Example 3 in which the content of the high melting point resin PP2 was 5% by weight, the lower limit of the moldable water vapor pressure showed a particularly low value of 0.10 MPa(G).

Comparative Example 1 is an example in which the foamed core layer was formed of the low melting point resin PP1 alone without containing the high melting point resin PP2 and in which the ratio of the intrinsic peak calorific value relative to the high temperature peak calorific value was made low. The molding water vapor pressure was high and the moldable range was narrow. Further, the compressive stress at the time of 50% strain was slightly low.

Comparative Example 2 is an example in which a foamed core layer was formed of the low melting point resin PP1 alone without containing the high melting point resin PP2 and in which the ratio of the intrinsic peak calorific value relative to the high temperature calorific value was set to the same level as in Example 1. Although low-pressure molding was possible, the compressive stress at 50% strain was slightly low. In addition, the voidage was lowered under the high molding vapor pressure conditions.

Comparative Example 3 is an example in which the high melting point resin PP2 was used in a large amount of 40% by weight. The effect of the high melting point resin PP2 was so large that a high molding vapor pressure was required.

Comparative Example 4 is an example in which the resin 2 having a low melting point was used in lieu of the low melting point resin PP1. Under the high forming vapor pressure condition, the voidage was lowered.

Comparative Example 5 is an example in which the resin composition was the same as that of Example 1 and in which the ratio of the intrinsic peak calorific value relative to the high temperature peak calorific value was controlled to be small by raising the expansion temperature. The molding vapor pressure was high so that the compressive stress at 50% strain of the obtained expanded beads molded article was slightly low. In Comparative Examples 1, 3 and 5, the "vapor pressure range 2" was not evaluated because the lower limit of the "vapor pressure range 1" was high and the low-pressure moldability was poor.

EXPLANATION OF SYMBOLS

1: Expanded beads molded article
2: Expanded bead
3: Foamed core layer
4: Through hole
5: Cover layer
6: Voids
12: Expanded beads

The invention claimed is:

1. An expanded bead having a through hole, said expanded bead comprising a foamed core layer that defines the through hole therein and that includes a polypropylene-based resin composition, and a cover layer that covers the foamed core layer and that includes a polyolefin-based resin,
wherein said polypropylene-based resin composition comprises 70 to 97% by weight of a polypropylene-based resin PP1 having a melting point of higher than 140° C. and not higher than 150° C., and 3 to 30% by weight of a polypropylene-based resin PP2 having a melting point of not lower than 145° C. and not higher than 160° C., provided that a total amount of the resin PP1 and the resin PP2 is 100% by weight,
wherein a difference between the melting point of the polypropylene-based resin PP2 and the melting point of the polypropylene-based resin PP1 [(melting point of PP2)−(melting point of PP1)] is not smaller than 5° C. and smaller than 15° C.,
said expanded bead having such a crystal structure that gives a first time DSC curve when measured by heat flux differential scanning calorimetry in which said expanded bead is heated from 30° C. to 200° C. at a heating rate of 10° C./min,
wherein said first time DSC curve has a main endothermic peak intrinsic to the polypropylene-based resin composition and a high temperature-side endothermic peak which is located on a higher temperature side of the main endothermic peak,
wherein said high temperature-side endothermic peak has a heat of fusion of 12 to 20 J/g, and
wherein a ratio of a heat of fusion of said main endothermic peak to the heat of fusion of said high temperature-side endothermic peak is 3.5 or greater.

2. The polypropylene-based resin expanded bead according to claim 1, wherein the melting point of the polypropylene-based resin PP1 is higher than 140° C. and not higher than 145° C. and the melting point of the polypropylene-based resin PP2 is not lower than 150° C. and not higher than 155° C.

3. The polypropylene-based resin expanded bead according to claim 1, wherein the polypropylene-based resin PP2 has a melt flow rate (MFR) of 2 to 18 g/10 min at 230° C. and a load of 2.16 kg.

4. The polypropylene-based resin expanded bead according to claim 1, wherein the polypropylene-based resin PP1 and the polypropylene-based resin PP2 are each a polypropylene-based resin that is obtained by polymerization using a Ziegler-Natta catalyst.

5. The polypropylene-based resin expanded bead according to claim 1, having a bulk density of 15 to 50 kg/cm$^3$.

6. The polypropylene-based resin expanded bead according to claim 1, having an average outer diameter D [mm], an average hole diameter d [mm] of the through hole and an average wall thickness t [mm] which is defined as (D−d)/2, wherein t is 0.8 to 2 mm and t/d is 0.4 to 1.

7. A polypropylene-based resin expanded beads molded article comprising a multiplicity of the expanded beads according to claim 1 that are fusion-bonded to each other, said expanded beads molded article being formed with interconnected voids and having a voidage of 20% or more.

* * * * *